(12) United States Patent
Chou et al.

(10) Patent No.: US 11,941,785 B2
(45) Date of Patent: Mar. 26, 2024

(54) DIRECTIONAL SCALING SYSTEMS AND METHODS

(71) Applicant: Apple Inc., Cupertino, CA (US)

(72) Inventors: Jim C Chou, San Jose, CA (US); Yun Gong, Cupertino, CA (US)

(73) Assignee: Apple Inc., Cupertino, CA (US)

(*) Notice: Subject to any disclaimer, the term of this patent is extended or adjusted under 35 U.S.C. 154(b) by 205 days.

(21) Appl. No.: 17/331,602

(22) Filed: May 26, 2021

(65) Prior Publication Data

US 2021/0287344 A1    Sep. 16, 2021

Related U.S. Application Data

(63) Continuation of application No. 16/053,360, filed on Aug. 2, 2018, now Pat. No. 11,024,012.

(51) Int. Cl.
*G06T 5/00* (2006.01)
*G06T 3/40* (2006.01)
(Continued)

(52) U.S. Cl.
CPC ............ *G06T 5/002* (2013.01); *G06T 3/4007* (2013.01); *G06T 5/50* (2013.01); *G06T 2207/20192* (2013.01); *G06T 2207/20216* (2013.01)

(58) Field of Classification Search
CPC ......... G06T 5/002; G06T 3/4007; G06T 5/50; G06T 2207/20192; G06T 2207/20216
See application file for complete search history.

(56) References Cited

U.S. PATENT DOCUMENTS

| 5,790,714 A | 8/1998 | McNeil et al. |
| 7,054,501 B1 | 5/2006 | Gindele et al. |
| (Continued) |

FOREIGN PATENT DOCUMENTS

| CN | 103093418 A | 5/2013 |
| CN | 103856767 A | 6/2014 |
| (Continued) |

OTHER PUBLICATIONS

Thurnhofer Set Al: "Edge-Enhanced Image Zooming", Optical Engineering, Soc. of Photo-Optical Instrumentation Engineers, vol. 35, No. 7, Jul. 1, 1996, pp. 1862-1869 (Year: 1996).*

(Continued)

*Primary Examiner* — Umair Ahsan
(74) *Attorney, Agent, or Firm* — Fletcher Yoder P.C.

(57) ABSTRACT

An electronic device may include scaling circuitry to scale input pixel data to a greater resolution. The directional scaling circuitry may include first interpolation circuitry to receive best mode data, including one or more angles corresponding to content of the image and interpolate first pixel values at first pixel positions diagonally offset from input pixel positions of the input pixel data based on the best mode data and input pixel values corresponding to the input pixel positions. The directional scaling circuitry may also include second interpolation circuitry to receive the best mode data and the input pixel values and interpolate second pixel values at second pixel positions horizontally or vertically offset from the input pixel positions based at least in part on the best mode data and the input pixel values.

19 Claims, 16 Drawing Sheets

(51) Int. Cl.
  *G06T 3/4007* (2024.01)
  *G06T 5/50* (2006.01)

(56) References Cited

U.S. PATENT DOCUMENTS

| | | | |
|---|---|---|---|
| 7,084,906 | B2 | 8/2006 | Adams, Jr. et al. |
| 7,116,838 | B2 | 10/2006 | Gindele et al. |
| 7,782,401 | B1 | 8/2010 | Chou |
| 7,903,880 | B2 | 3/2011 | Wyatt et al. |
| 7,945,110 | B2 | 5/2011 | Wu et al. |
| 8,072,540 | B2 | 12/2011 | Hsu |
| 8,165,415 | B2 | 5/2012 | Hsu |
| 8,175,411 | B2 | 5/2012 | Segall |
| 8,494,308 | B2 | 7/2013 | Pan |
| 8,643,777 | B2 * | 2/2014 | Wallace ............... H04N 7/0142 348/625 |
| 9,407,890 | B2 | 8/2016 | Shin et al. |
| 9,466,099 | B2 | 10/2016 | Kobayashi et al. |
| 9,626,760 | B2 | 4/2017 | Narahari et al. |
| 2008/0055338 | A1 * | 3/2008 | Wei ....................... G09G 5/005 345/667 |
| 2009/0028465 | A1 | 1/2009 | Pan |
| 2009/0087120 | A1 | 4/2009 | Wei |
| 2013/0050272 | A1 | 2/2013 | Bernard |
| 2014/0153823 | A1 | 6/2014 | Lee et al. |
| 2016/0217625 | A1 | 7/2016 | Oba et al. |

FOREIGN PATENT DOCUMENTS

| | | |
|---|---|---|
| CN | 105814886 A | 7/2016 |
| EP | 0565948 A2 | 10/1993 |
| EP | 0710925 A2 | 5/1996 |

OTHER PUBLICATIONS

Thurnhofer S. et al.; "Edge-Enhanced Image Zooming", Society of Photo-optical Instrumentation Engineers, Optical Engineering, vol. 35, No. 7, Jul. 1, 1996, pp. 1862-1869 (XP000631007).

Leitao J. A., et al.; "Content-Adaptive Video Up-Scaling for High Definition Display", Visual Communication and image Processing, vol. 5022, Jan. 21, 2003, pp. 612-622 (XP001183234).

International Search Report and Written Opinion for PCT Patent Application No. PCT/US2019/043322 dated Oct. 15, 2019; 14 pgs.

Chinese Office Action for Chinese Application No. 201980051423.7 dated Aug. 4, 2021; 5 pgs.

\* cited by examiner

DIRECTIONAL SCALING SYSTEMS AND METHODS

CROSS REFERENCE TO RELATED APPLICATIONS

This application is a Continuation of and claims priority to U.S. patent application Ser. No. 16/053,360, filed Aug. 2, 2018 and entitled "DIRECTIONAL SCALING SYSTEMS AND METHODS", which is incorporated herein by reference in its entirety for all purposes.

BACKGROUND

The present disclosure relates generally to image processing and, more particularly, to the analysis of pixel statistics of, scaling of, and/or enhancement of image data used to display images on an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. To display an image, an electronic display may control light emission (e.g., luminance) of its display pixels based at least in part on corresponding image/pixel data.

Generally, image data may indicate a resolution (e.g., dimensions of pixels to be used) corresponding with an image. However, in some instances, it may be desirable to scale the image to a higher resolution, for example for display on an electronic displays with a higher resolution output. Thus, before being used to display an image, the image data may be processed to convert the image data to a desired resolution. However, at least in some instances, techniques used to scale image data may affect perceived image quality of the corresponding image, for example, by introducing image artifacts such as jagged edges. Pixel statistics may be employed when undergoing image enhancement to correct such artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In some instances, an electronic device may scale and/or enhance image data to improve perceived quality of an image. In some embodiments, the alterations to the image data may be based at least in part on the content of an image corresponding to the image data. Such altered image data may be stored in memory or displayed on an electronic display. In some embodiments, image data may indicate a target luminance per color component (e.g., channel), for example, via red component image data, blue component image data, and green component image data. Additionally or alternatively, image data may indicate target luminance in grayscale (e.g., gray level) or via luma and chrominance components (e.g., YCbCr).

To facilitate improvements to the image data, noise statistics may be gathered and analyzed. For example, frequency bands within the image data may be identified to assist in differentiating image content from noise. As such, the content of the image may be enhanced while minimizing the effect of noise on the output image. In some embodiments, pixels that do not meet certain criteria may be excluded from the noise statistics.

Additionally, differential statistics and the sum of absolute differences (SAD) may be applied to pixel grouping of the image data. Such pixel groupings may be selected and compared, via angle detection circuitry, in multiple directions relative to a pixel of interest to identify a best mode (e.g., angle) of interpolation. The comparisons of the different pixel groupings may identify features (edges, lines, and/or changes) in the content of the image that may assist in enhancing or scaling the image data using the best mode. Best mode data may include one or more angles that most accurately describes the features of the content of the image at the position of a pixel of interest. Additionally, best mode data from multiple pixels of interest may be compiled together for use in pixel value interpolation.

For example, in one embodiment, the differential and SAD statistics may facilitate an increase in the image resolution by interpolating new pixel values based at least in part on the best mode data. Directional scaling circuitry may utilize the identified angles to maintain the features of the image while minimizing the introduction of artifacts such as jagged edges (e.g., staircasing). In some embodiments, the directional scaling circuitry may interpolate pixels diagonal to the original image data pixel locations by generating a weighted average of original pixels. The weighted average may, for example, be based on the differential and SAD statistics and the angle identified therefrom. Additionally, the directional scaling circuitry may generate pixel values located horizontally and vertically from the original pixels by determining a weighted average of the original pixels and/or the new diagonal pixels. This weighted average may also be based, at least in part, on the differential and SAD statistics.

Used in conjunction with or separate from the directional scaling circuitry, enhancement circuitry may also use differential and SAD statistics to adjust the image data of the image. Additionally or alternatively, the enhancement circuitry may use noise statistics and/or a low resolution version of the image to generate image enhancements. Such enhancement may provide an increased sharpness to the image. In some embodiments, example-based enhancement using a lower resolution version of the image for comparison may provide enhancement to one or more channels of the image data. For example, a luma channel of the image data may be enhanced based on a sum of square differences or approximation thereof between the image and a low resolution version of the image. Additionally, the enhancement circuitry may employ a peaking filter to enhance high frequency aspects (e.g., cross hatching) of the image. Such enhancement may provide improved spatial resolution and/or decreased blur. Furthermore, the enhancement circuitry may determine color tones within the image to identify certain content (e.g., sky, grass, and/or skin). The example-based enhancement, peaking filter, and/or tone determination may each target different textures of the image to incorporate enhancement, and enhancements stemming from each may be controlled independently and based on the local features of the image.

Depending on implementation, noise statistics circuitry, angle detection circuitry, directional scaling circuitry, and enhancement circuitry may be used individually and/or in combination to facilitate improved perceived image quality and/or to alter image data to a higher resolution while reducing the likelihood of image artifacts.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
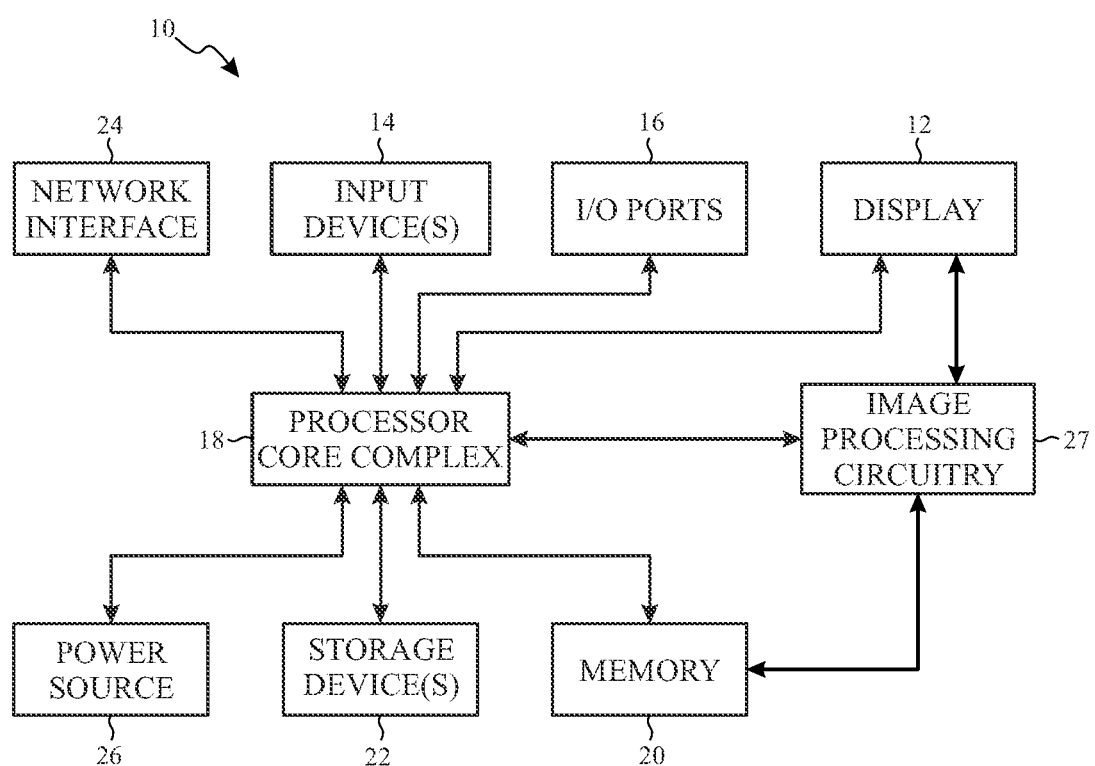
FIG. 1 is a block diagram of an electronic device that includes an electronic display, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

To facilitate communicating information, electronic devices often use one or more electronic displays to present visual representations of information via one or more images (e.g., image frames). Such electronic devices may include computers, mobile phones, portable media devices, tablets, televisions, virtual-reality headsets, and vehicle dashboards, among many others. Additionally or alternatively, an electronic display may take the form of a liquid crystal display (LCD), a light emitting diode (LED) display, an organic light emitting diode (OLED) display, a plasma display, or the like.

In any case, to display an image, an electronic display generally controls light emission (e.g., luminance and/or color) of its display pixels based on corresponding image data received at a particular resolution (e.g., pixel dimensions). For example, an image data source (e.g., memory, an input/output (I/O) port, and/or a communication network) may output image data as a stream of pixel data (e.g., image data), in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively RGB. Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma corrected luma values.

To facilitate improving perceived image quality, image data may be processed before being output to an electronic display or stored in memory for later use. For example, a processing pipeline, implemented via hardware (e.g., circuitry) and/or software (e.g., execution of instructions stored in tangible, non-transitory, media), may facilitate such image processing. In some instances, it may be desirable to scale image data to a higher resolution, for example to match the resolution of an electronic display or to make the image appear larger. However, at least in some instances, this may affect perceived image quality, for example, by resulting in perceivable visual artifacts, such as blurriness, jagged edges (e.g., staircasing), and/or loss of detail.

Accordingly, to facilitate improving perceived image quality, the present disclosure provides techniques for identifying content of the image (e.g., via statistics), scaling the image data to increase the resolution while maintaining image definition (e.g., sharpness), and/or enhancing image data to increase the clarity of the image. In some embodiments, a processing pipeline may include a scaler block to directionally scale image data while accounting for lines, edges, patterns, and angles within the image. Such content dependent processing may allow for the image data to be scaled to a higher resolution without, or with a reduced amount of, artifacts. In one embodiment, the ability to increase the resolution of an image without introducing noticeable artifacts may allow for images to be stored at a lower resolution, thus saving memory space and/or bandwidth, and restore the image to a higher resolution before displaying the image. Additionally, the image data may undergo further enhancement before being output or stored.

In pursuit of such content dependent processing, the scaler block may include, for example, a noise statistics block, an angle detection block, a directional scaling block, and an image enhancement block. The noise statistics block may identify and differentiate noise from the rest of the image data using statistical analysis on gathered pixel statistics. As such, noise may be ignored or given less weight if/when the image data undergoes enhancement. The angle detection block may gather statistics based on the sum of absolute differences (SAD) and/or differentiation (DIFF). These SAD and DIFF statistics may be determined at multiple angles around input pixels to identify angles of interest from which to base scaling interpolation and/or enhancement. The identified best mode data, containing, for example, best angles, weights, etc., for each input pixel may, therefore, assist in characterizing the image content to aid in the directional scaling of the image data. The directional scaling block my take the input image data and the best mode data and interpolate a midpoint pixel and an exterior point pixel to generate new pixel data to add to the input image data, thus, generating scaled image data. The scaled image data may additionally be enhanced via the image enhancement block by identifying tones within the image and comparing the scaled image data to the input image data via example-based improvement. As such, the scaler block may incorporate hardware and/or software components to facilitate determination of noise and angles of interest, scaling of image data to a higher resolution while reducing the likelihood of image artifacts, and/or image enhancement.

To help illustrate, an electronic device 10, which may include an electronic display 12, is shown in FIG. 1. As will be described in more detail below, the electronic device 10 may be any suitable electronic device 10, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component. Additionally or alternatively, the image processing circuitry 27 (e.g., a graphics processing unit) may be included in the processor core complex 18.

As depicted, the processor core complex 18 is operably coupled with local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more general purpose microprocessors, one or more application specific integrated circuits (ASICs), one or more field programmable gate arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate data communication with another electronic device and/or a communication network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network.

Additionally, as depicted, the processor core complex 18 is operably coupled to the power source 26. In some embodiments, the power source 26 may provide electrical power to one or more components in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, I/O ports 16 may enable the electronic device 10 to interface with other electronic devices. For example, when a portable storage device is connected, the I/O port 16 may enable the processor core complex 18 to communicate data with the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from its display pixels to present visual representations of information, such as a graphical user interface (GUI) of an operating system, an application interface, a still image, or video content, by displaying frames based at least in part on corresponding image data (e.g., image pixel data located at individual pixel positions).

As depicted, the electronic display 12 is operably coupled to the processor core complex 18 and the image processing circuitry 27. In this manner, the electronic display 12 may display images based at least in part on image data received from an image data source, such as the processor core complex 18 and/or the image processing circuitry 27. In some embodiments, the image data source may generate source image data to create a digital representation of the image to be displayed. In other words, the image data is generated such that the view on the electronic display 12 accurately represents the intended image. Additionally or alternatively, the electronic display 12 may display images based at least in part on image data received via the network interface 24, an input device 14, and/or an I/O port 16. To facilitate accurately representing an image, image data may be processed before being supplied to the electronic display 12, for example, via a processing pipeline and/or a display pipeline implemented in the processor core complex 18 and/or the image processing circuitry 27. Additionally, in some embodiments, image data may be obtained, for example from memory 20, processed, for example in a processing pipeline, and returned to its source (e.g., memory 20). Such a technique, as described herein, is known as memory-to-memory processing.

As will be described in more detail below, the processing pipeline may perform various processing operations, such as image scaling, rotation, enhancement, pixel statistics gathering and interpretation, spatial and/or temporal dithering, pixel color-space conversion, luminance determination, luminance optimization, and/or the like. For example, the processing pipeline may directionally scale image data to increase the resolution while using the content of the image data to reducing the likelihood of producing perceivable visual artifacts (e.g., jagged edges, banding, and/or blur) when the corresponding image is displayed on an electronic display 12.

In some embodiments, after image data is received, the electronic display 12 may perform additional processing on the image data, for example, facilitate further improving the accuracy of a viewed image. For example, the electronic display 12 may again scale, rotate, spatially dither, and/or enhance the image data. As such, in some embodiments, a processing pipeline may be implemented with the electronic display 12.

Figure 2:
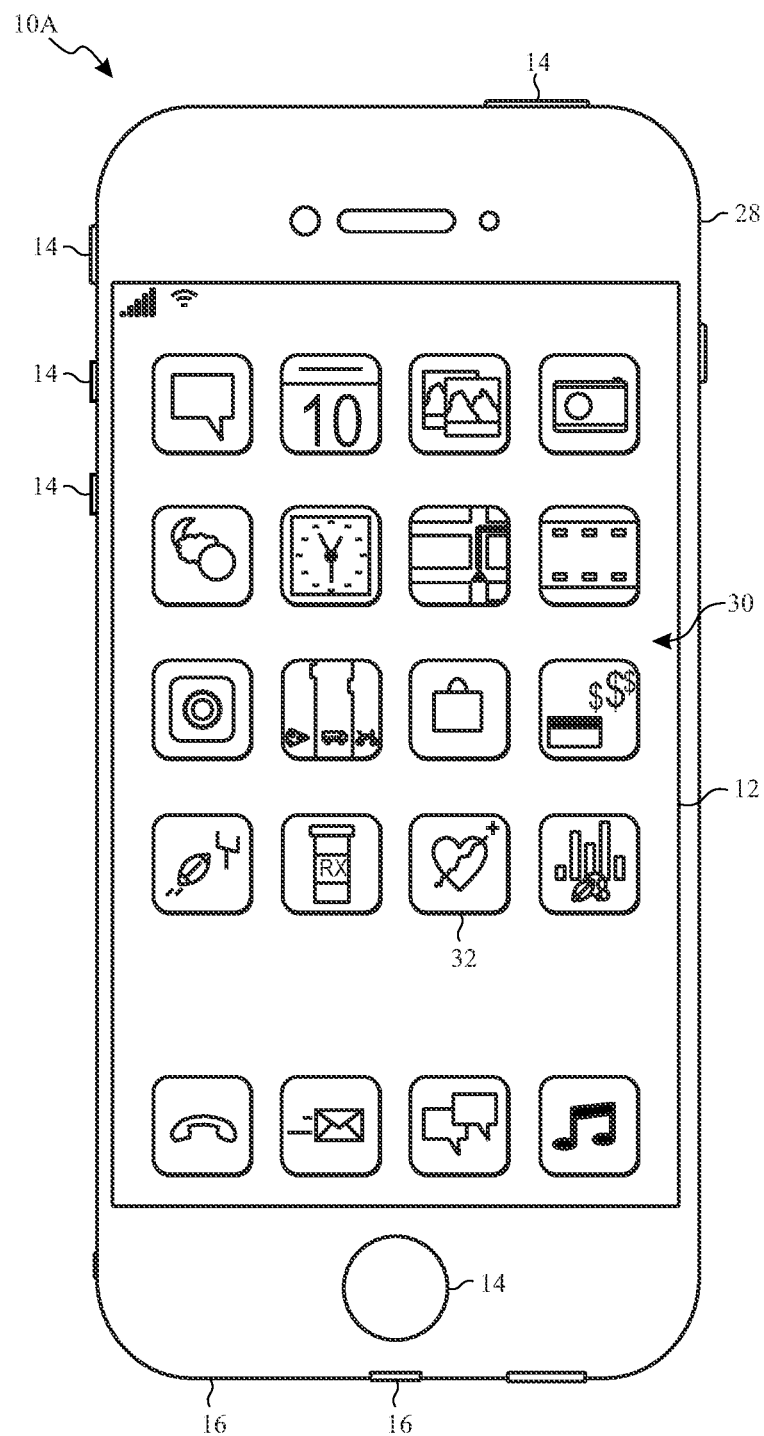
FIG. 2 is an example of the electronic device of FIG. 1, in accordance with an embodiment.

As described above, the electronic device 10 may be any suitable electronic device. To help illustrate, one example of a suitable electronic device 10, specifically a handheld device is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 may surround the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 may be accessed through openings in the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 may be accessed through openings in the enclosure 28. In some embodiments, the I/O ports 16 may include, for example, an audio jack to connect to external devices.

Figure 3:
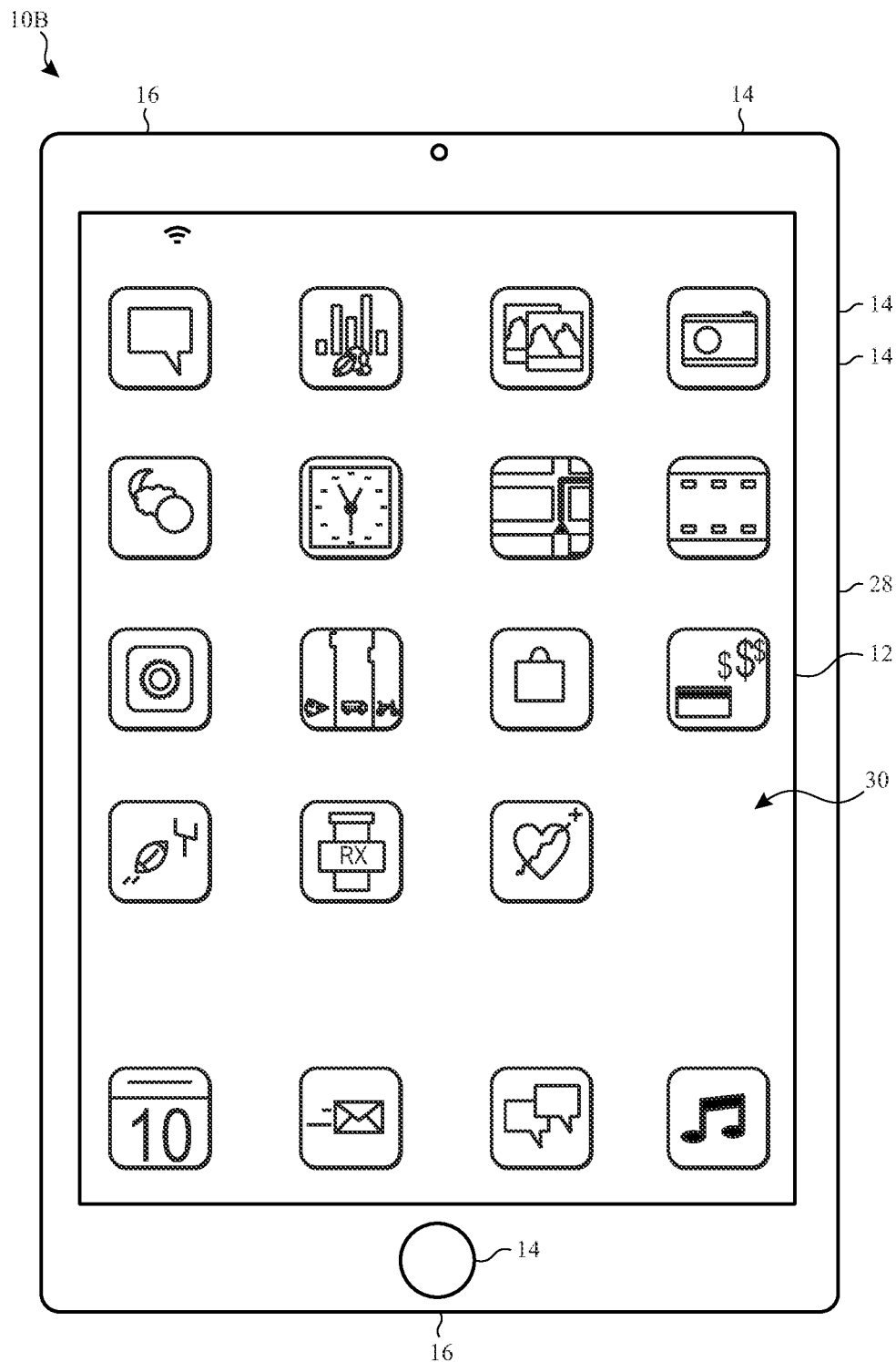
FIG. 3 is another example of the electronic device of FIG. 1, in accordance with an embodiment.
Figure 4:
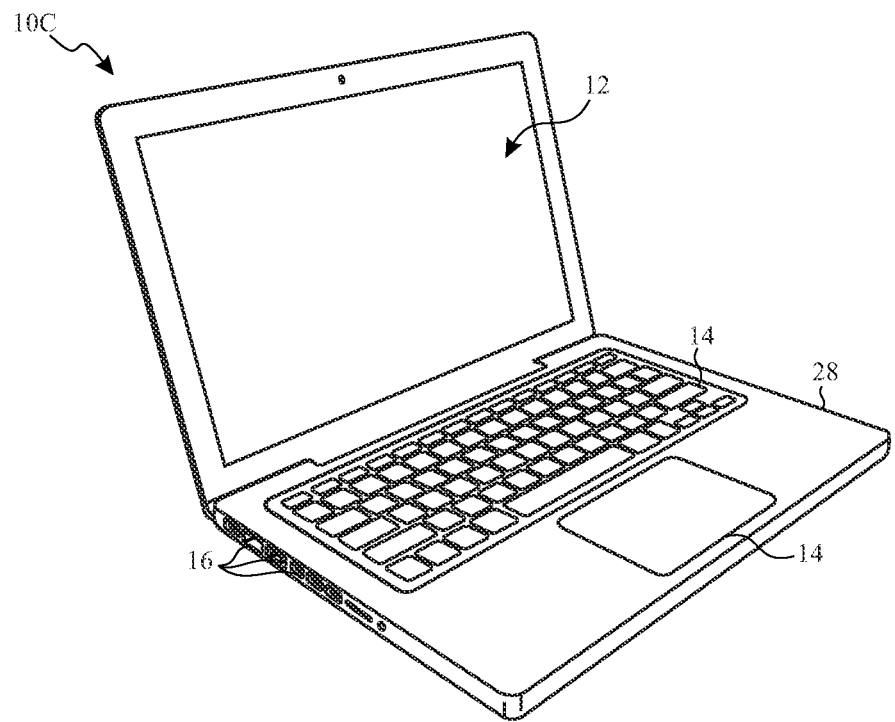
FIG. 4 is another example of the electronic device of FIG. 1, in accordance with an embodiment.
Figure 5:
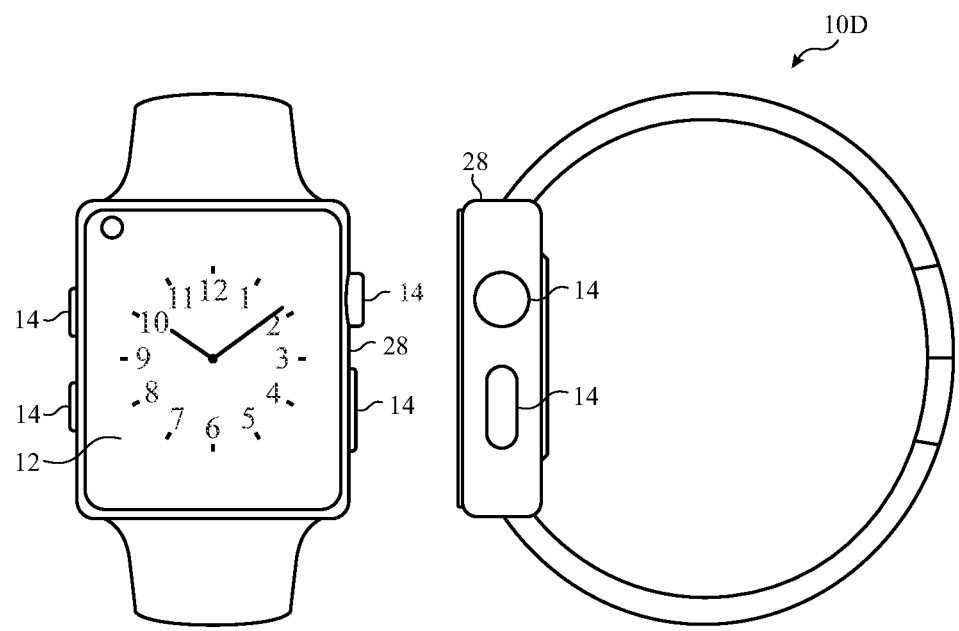
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

Figure 6:
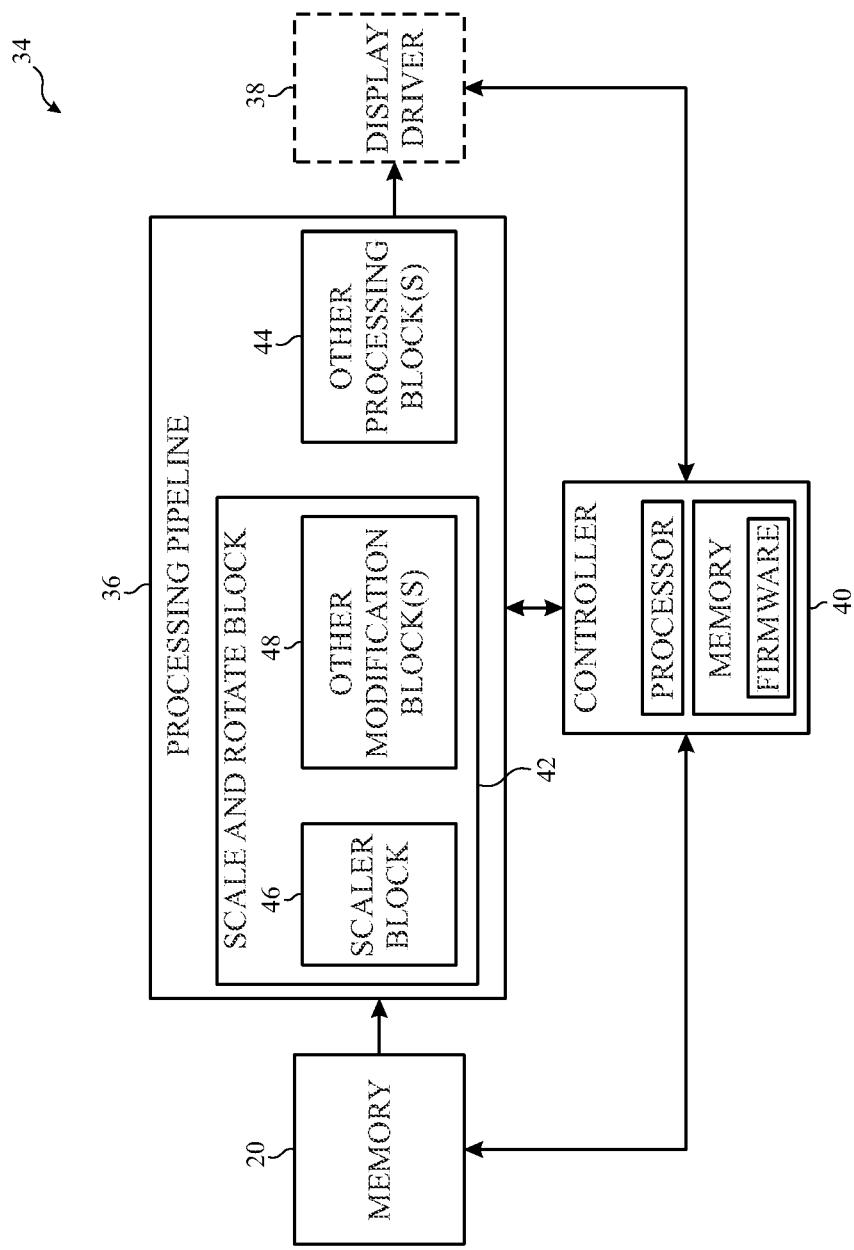
FIG. 6 is a block diagram of a processing pipeline coupled to memory of the electronic device of FIG. 1, in accordance with an embodiment.

As described above, an electronic display 12 may display images based on image data received from an image data source. To help illustrate, a portion 34 of the electronic device 10 including a processing pipeline 36 that operationally retrieves, processes, and outputs image data is shown in FIG. 6. In some embodiments, a processing pipeline 36 may analyze and/or process image data received from memory 20, for example, by directionally scaling and enhancing the image data before the image data is used to display an image or be stored in memory 20 as in memory-to-memory processing. In such a scenario, image data may be directionally scaled to a higher resolution and then stored in memory for later viewing. In some embodiments, the processing pipeline 36 may be or be incorporated into a display pipeline and, thus, be operatively coupled to a display driver 38 to generate and supply analog and/or digital electrical signals to display pixels of the electronic display 12 based at least in part on the image data.

In some embodiments, the processing pipeline 36 may be implemented in the electronic device 10, the electronic display 12, or a combination thereof. For example, the processing pipeline 36 may be included in the processor core complex 18, the image processing circuitry 27, a timing controller (TCON) in the electronic display 12, one or more other processing units or circuitry, or any combination thereof.

In some embodiments, a controller 40 may control operation of the processing pipeline 36, the memory 20, and/or the display driver 38. To facilitate controlling operation, the controller 40 may include a controller processor and controller memory. In some embodiments, the controller processor may execute instructions stored in the controller memory such as firmware. In some embodiments, the controller processor may be included in the processor core complex 18, the image processing circuitry 27, a timing controller in the electronic display 12, a separate processing module, or any combination thereof. Additionally, in some embodiments, the controller memory may be included in the local memory 20, the main memory storage device 22, a separate tangible, non-transitory, computer readable medium, or any combination thereof.

In some embodiments, the memory 20 may include a source buffer that stores source image data. Thus, in such embodiments, the processing pipeline 36 may fetch (e.g., retrieve) source image data from the source buffer for processing. In some embodiments, the electronic device 10 may include multiple pipelines (e.g., a processing pipeline 36, a display pipeline, etc.) implemented to process image data. To facilitate communication, image data may be stored in the memory 20, external from the pipelines. In such embodiments, pipelines (e.g., the processing pipeline 36) may include a direct memory access (DMA) block that reads (e.g., retrieves) and/or writes (e.g., stores) image data in the memory 20.

After received from memory 20, the processing pipeline 36 may process source image data via one or more image processing blocks such as a scale and rotate block 42 or other processing blocks 44 (e.g., dither block). In the depicted embodiment, the scale and rotate block 42 includes a scaler block 46 and also may include other modification block(s) 48 (e.g., a rotation block, flipping block, mirroring block, etc.). As will be described in more detail below, the scaler block 46 may adjust image data (e.g., via directional scaling and/or enhancement), for example, to facilitate reducing the likelihood of or correcting for image artifacts generally associated with scaling. As an illustrative example, it may be desirable to increase the resolution of image data to enlarge viewing of the corresponding image or accommodate the resolution of an electronic display 12. To accomplish this, the scaler block 46 may employ noise statistics and/or SAD and DIFF statistics to analyze the content of the image data and scale the image data to a higher resolution while maintaining image definition (e.g., sharpness). In some embodiments, the image data may also undergo enhancement.

Figure 7:
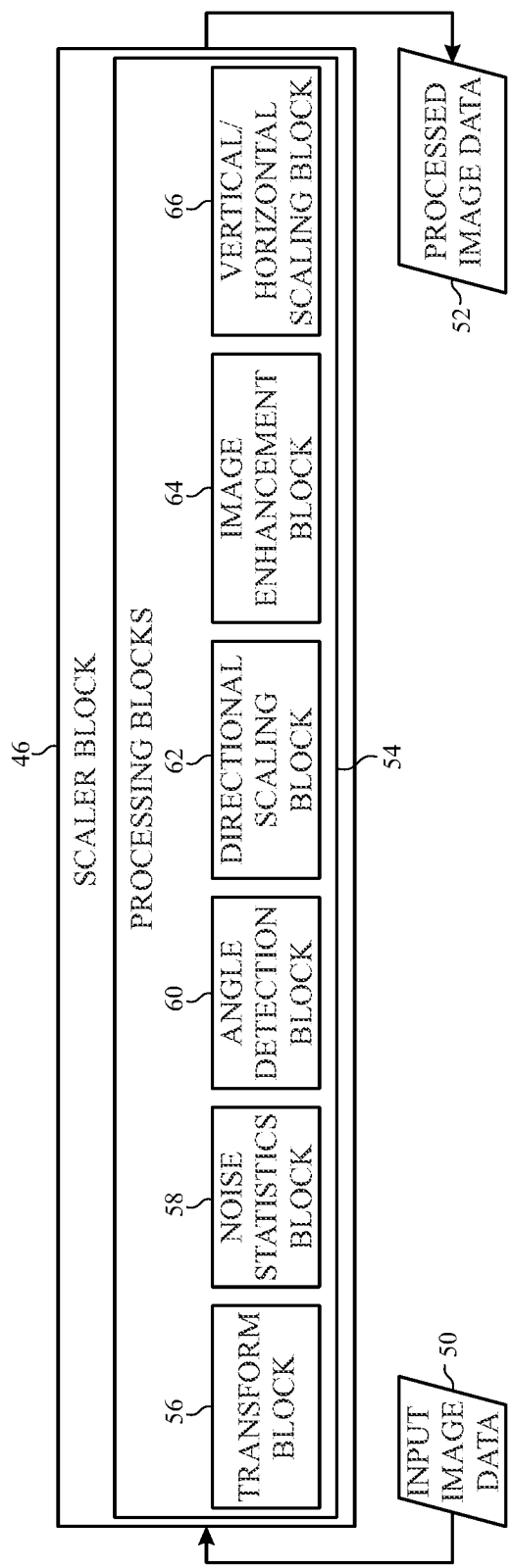
FIG. 7 is a block diagram of a scaler block that may be used by the electronic device of FIG. 1, in accordance with an embodiment.

To help illustrate, FIG. 7 is a block diagram of the scaler block 46 receiving input image data 50 and outputting processed image data 52. The scaler block 46 may include multiple processing blocks 54 to carry out the directional scaling and/or enhancement. For example, the scaler block 46 may include a transform block 56, a noise statistics block 58, an angle detection block 60, a directional scaling block 62, an image enhancement block 64, and a vertical/horizontal scaling block 66.

The processing blocks 54 of the scaler block 46 may receive and/or process input image data 50 in multiple color bases (e.g., red-green-blue (RGB), alpha-red-green-blue (ARGB), luma-chrominance (a YCC format, such as YCbCr or YUV), etc.) and/or bit depths (e.g., 8-bit, 16-bit, 24-bit, 30-bit, 32-bit, 64-bit, and/or other appropriate bit depths). Additionally, high dynamic range (HDR) image data (e.g., HDR10, perceptual quantizer (PQ), etc.) may also be processed. However, in some embodiments, it may be desirable to process or generate statistics from the input image data 50 utilizing a channel representing a luma value (e.g., a Y channel). A single luma channel may retain the content (e.g., edges, angles, lines, etc.) of the image for pixel statistics gathering and interpretation for directional scaling and enhancement. Depending on the color basis of the input image data 50, a transform block 56 may generate luma pixel data representing the target white, black, or grey point of the input image data 50. The luma pixel data may then be used by other processing blocks 54. By way of example, if the input image data 50 uses an RGB format, the transform block 56 may apply a weighting coefficient to each channel (i.e., the red, green, and blue channels) and combine the result to output a single channel of luma pixel data. Additionally or alternatively, the processing blocks 54 may use non-luma pixel data to gather and interpret pixel statistics as well as for directional scaling and enhancement.

In one embodiment, the noise statistics block 58 may receive luma pixel data corresponding to the input image data 50. The noise statistics block 58 may then process the luma pixel data through one or more vertical and/or horizontal filters and quantify a qualification for the luma pixel data corresponding to each pixel. The qualifying luma pixel data may be used to generate noise statistics, from which the noise statistics block 58 may identify patterns in the image data content, for example, for use in the image enhancement block 64. The image enhancement block 64 may take scaled image data and/or the input image data 50 and use tone detection, comparisons between a low resolution input and a high resolution input, and the noise statistics to enhance (e.g., sharpen) the image data generating enhanced image data.

An angle detection block 60, may also receive luma pixel data corresponding to the input image data 50. The angle detection block 60 may analyze SAD and DIFF statistics at multiple angles about a pixel of interest to identify angles corresponding to lines and/or edges within the input image data 50 content. These angles may then be used in the directional scaling block 62 to facilitate improved interpolation of new pixels generated when scaling to a higher resolution (e.g., twice the dimensions of the original image resulting in approximately four times as many pixels). Additionally or alternatively, a vertical/horizontal scaling block 66 may further scale the scaled image data to a higher or lower resolution to match the desired output resolution.

Figure 8:
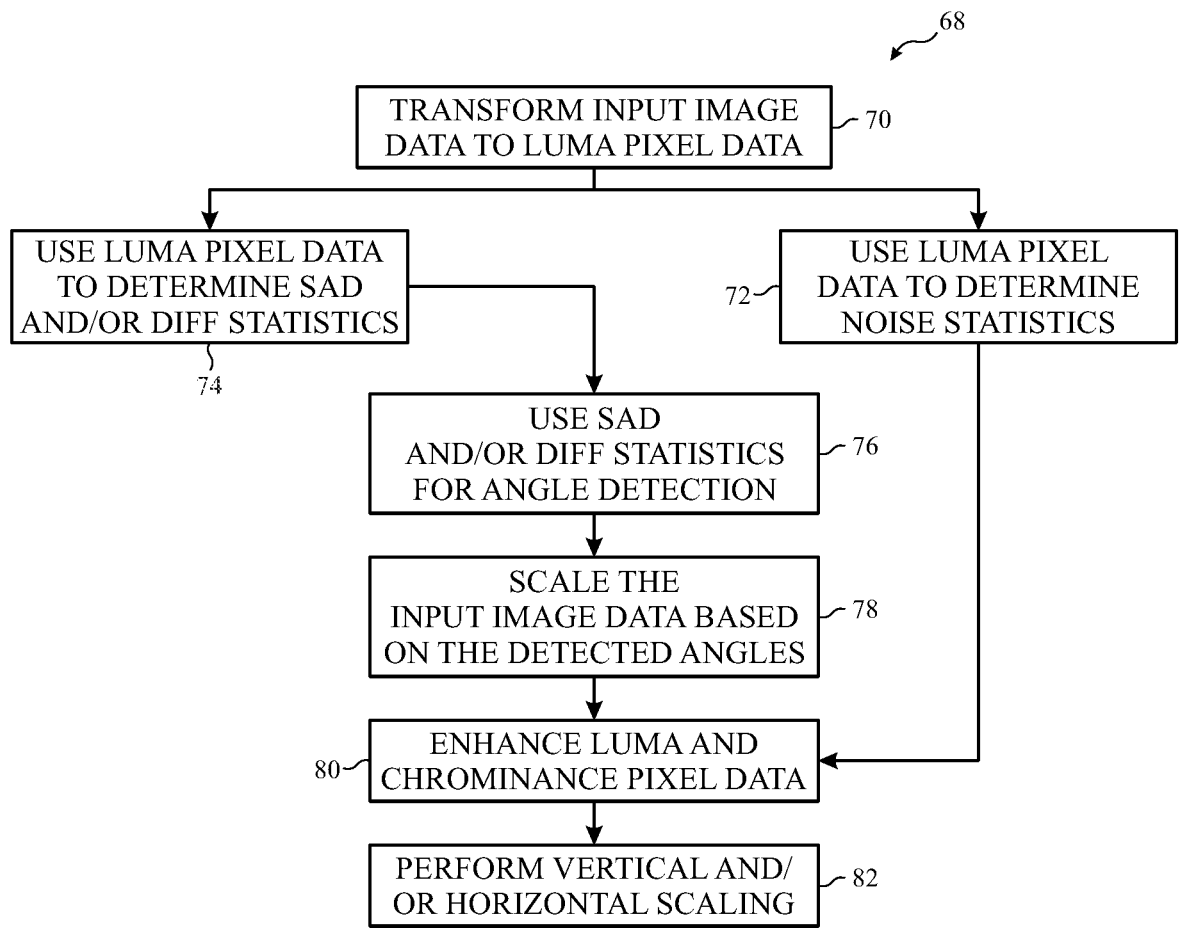
FIG. 8 is a flowchart of a process for operating the scaler block of FIG. 7, in accordance with an embodiment.

To help illustrate, FIG. 8 is a flowchart 68 depicting one embodiment of a process performed by the scaler block 46. As stated above, if desired, the scaler block 46 may transform input image data 50 to luma pixel data (process block 70), for example, using the transform block 56. The luma pixel data may be used to determine noise statistics (process block 72), for example, via the noise statistics block 58. The luma pixel data may also be used to determine SAD and/or DIFF statistics (process block 74), which may then be used for angle detection (process block 76), for example, using the angle detection block 60. The scaler block 46 may also scale the input image data 50 based at least in part on the detected angles (process block 78), for example, via the directional scaling block 62. Using either the input image data 50 or scaled image data, the luma pixel data and/or chrominance pixel data may be enhanced to generate enhanced image data (process block 80), for example, via the image enhancement block 64. Additionally, if so desired, the scaler block 46 may also perform vertical and/or horizontal scaling of the image data (process block 82), for example, via the vertical/horizontal scaling block 66.

Figure 9:
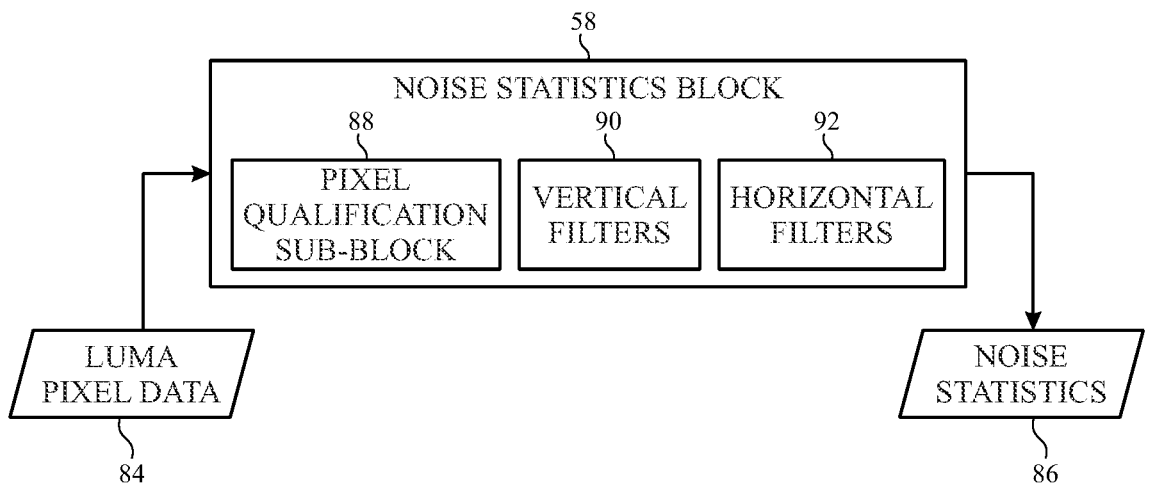
FIG. 9 is a block diagram of a noise statistics block implemented in the scaler block of FIG. 7, in accordance with an embodiment.

As stated above, the noise statistics block 58 may take luma pixel data 84 and generate noise statistics 86, as shown in FIG. 9. Noise statistics 86, based at least in part on the content of the input image data 50, may allow for the differentiation of noise from the more intentional features (e.g., features desired to be enhanced upon) of the image. In some embodiments, noisy aspects of the image are ignored when undergoing enhancement. To facilitate determining such noise, the noise statistics block 58 may include a pixel qualification sub-block 88, vertical filters 90, and/or horizontal filters 92.

The luma pixel data 84 may undergo processing in one or more vertical filters 90 and/or horizontal filters 92 in series, sequence, and/or parallel. Such filters 90 and 92 may include, for example, low-pass, bandpass, and/or high-pass filters able to identify and/or produce the frequency content of different frequency bands that correspond to an image. The pixel qualification sub-block 88 may use the luma pixel data 84 and/or the filtered luma pixel data to determine if the pixel data for each single pixel qualifies to be used in the noise statistics 86. In some embodiments, the noise statistics block 58 may sample each pixel of the luma pixel data 84. However, in some embodiments, for example if the directional scaling block 62 is not enabled, the noise statistics block 58 may sample less than the full set of luma pixel data 84 (e.g., one out of every 4 pixels).

Qualifying pixels are determined such that they meet one or more criteria. For example, in one embodiment, a pixel qualifies for noise statistics 86 if the pixel falls in an active region. In some embodiments, an active region may be set to group together related portions of an image while excluding unrelated portions of the image. For example, an active region may be set to exclude subtitles, constant color sections (e.g., letterboxes), and/or the like. Furthermore, the active region may be programmable and/or software optimizable to increase the likelihood of detecting various forms of noise from various contents. For example, movie content may include artificial noise, such as film grain, intentionally added to each video frame. It may be desirable to use a specific active region size to detect such artificial noises to increase or decrease enhancement. In some embodiments, the active region may include the entire image.

Additionally or alternatively, other criteria may also apply, for example, a percentage of pixels in a window around the pixel of interest (e.g., a 1×1 (the pixel itself) or 3×3 pixel window) may contain luma values within a specified range. Furthermore, a local activity measure (e.g., the sum of the filtered or non-filtered luma values of neighboring pixels) may also qualify a pixel for use in the noise statistics 86 if the local activity measure is greater than a threshold.

Once qualified, the filtered and/or non-filtered luma pixel data 84 may form noise statistics 86 by determining, for example, histograms, sums, maximums, minimums, means, variances, and/or a blockiness metric (e.g., a measure of corners and/or edges). A blockiness metric may be indicative of artifacts originating from, for example, block-based compression techniques. Such noise statistics 86 may be representative of the global luma values within the active region and/or local values within pixel windows (e.g., a 5×5 pixel window). The noise statistics 86 may represent frequency signatures (e.g., frequency bands) of image data indicative of blockiness, noise, or specific features possibly contained within the image (e.g., filmgrain, video capture noise, etc.). In some embodiments, features such as filmgrain are intentional within the image, and, as such, are desired to be enhanced and scaled appropriately. Different image features may have different frequency signatures, and, therefore, the features may be determined based on the analysis of the programed frequency bands. The differentiation of such features from noise allows for an improved scaling and enhancement of desirable image features, and the reduced enhancement of noise or noisy regions within the image.

Figure 10:
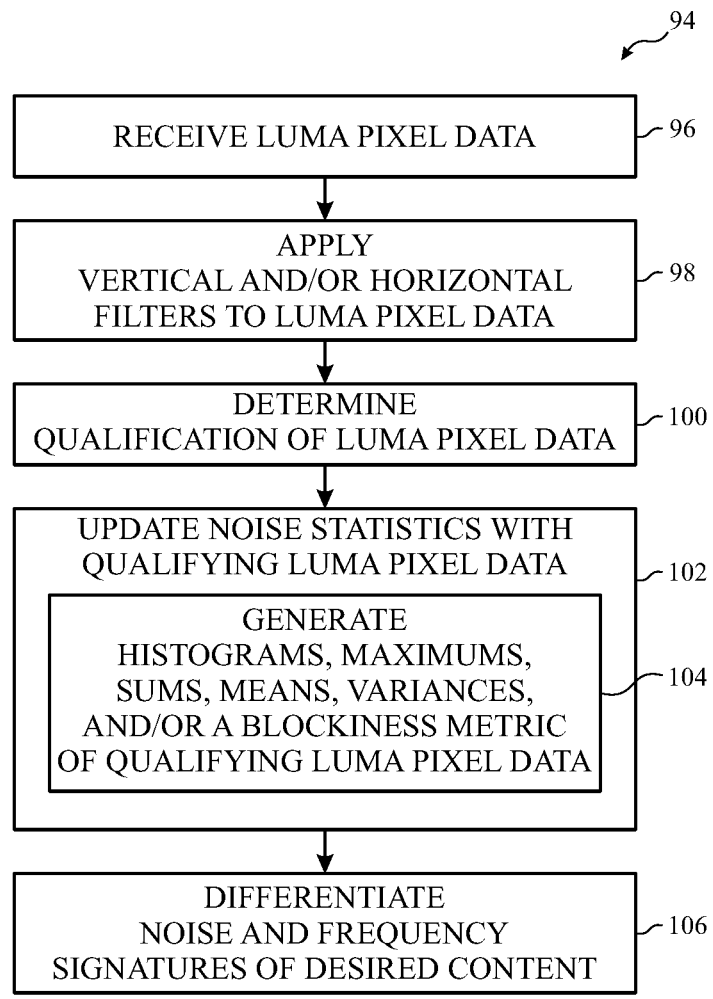
FIG. 10 is a flowchart of a process for operating the noise statistics block of FIG. 9, in accordance with an embodiment.

FIG. 10 is a flowchart 94 depicting an embodiment of a process for determining the noise statistics 86. The noise statistics block 58 may first receive luma pixel data 84 (process block 96), for example, from the input image data 50 or as transformed via the transform block 56. The noise statistics block 58 may then apply vertical and/or horizontal filters to the luma pixel data (process block 98). The noise statistics block 58 may also determine the qualification of the luma pixel data (process block 100). Qualifying luma pixel data may populate updates to the noise statistics 86 (process block 102). For example, the noise statistics 86 may be updated by generating histograms, maximums, sums, means, variances, a blockiness metric of qualifying luma pixel data, and/or other suitable metrics (process block 104). The noise statistics block 58 may also differentiate noise and the frequency signatures (e.g., pre-programmed frequency bands) of desirable content (e.g., filmgrain) (process block 106) from the content of the image. The noise statistics 86 may then be output for use in image enhancement and/or other image processing techniques.

Figure 11:
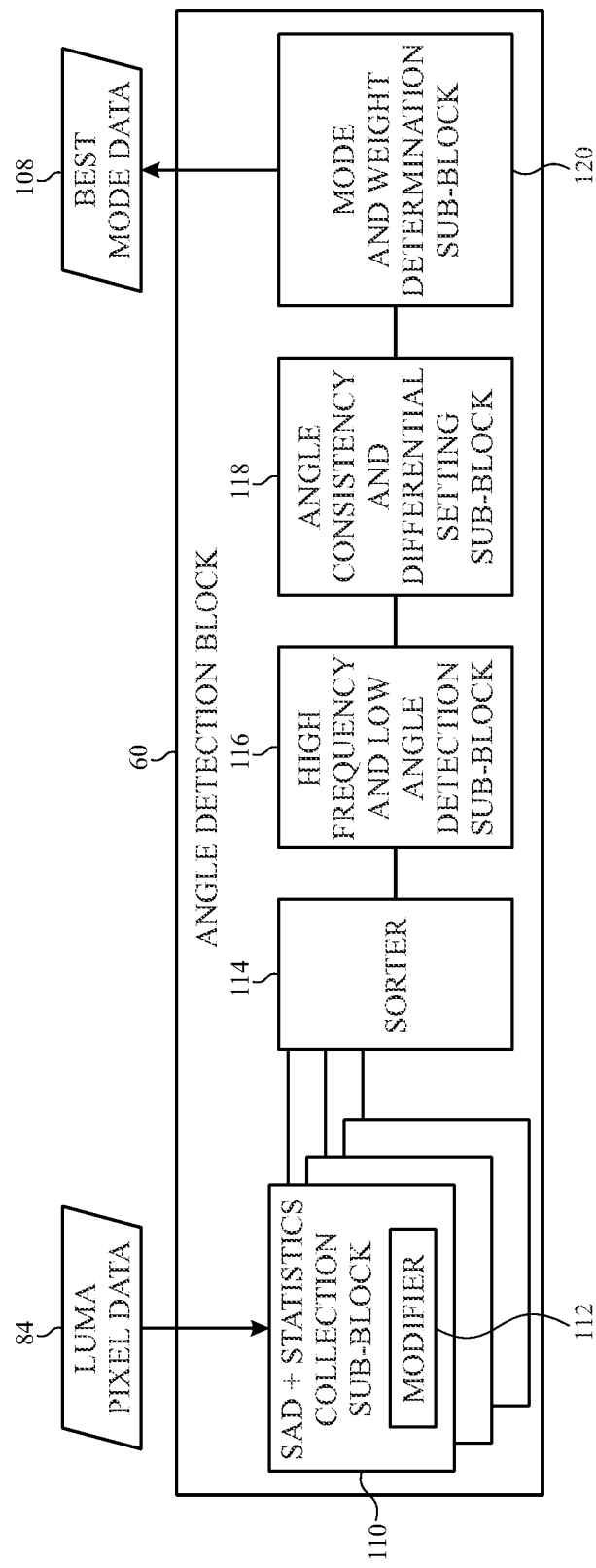
FIG. 11 is a block diagram of an angle detection block implemented in the scaler block of FIG. 7, in accordance with an embodiment.

Similar to the noise statistics block 58, the angle detection block 60 may also take as an input the luma pixel data 84 on which to determine statistics. From such statistics, the angle detection block 60, as depicted in FIG. 11, may generate best mode data 108. In one embodiment, the best mode data 108 may include one or more angles corresponding to lines and edges of the image. Additionally, the best mode data 108 for each sampled pixel may include weights for the one or more angles corresponding to a confidence level for the angle(s) and/or the similarity of the angle(s) to those of neighboring pixels. The best mode data 108 may facilitate improved directional scaling of the image data. The angle detection block 60 may include a SAD and DIFF statistics collection sub-block 110 with a modifier 112, a sorter 114, a high frequency and low angle detection sub-block 116, an angle consistency and differential setting sub-block 118, and a mode and weight determination sub-block 120. The generation and analysis of the SAD and DIFF statistics along with the assessment of confidences and consistencies may yield the best mode data 108.

Figure 12:
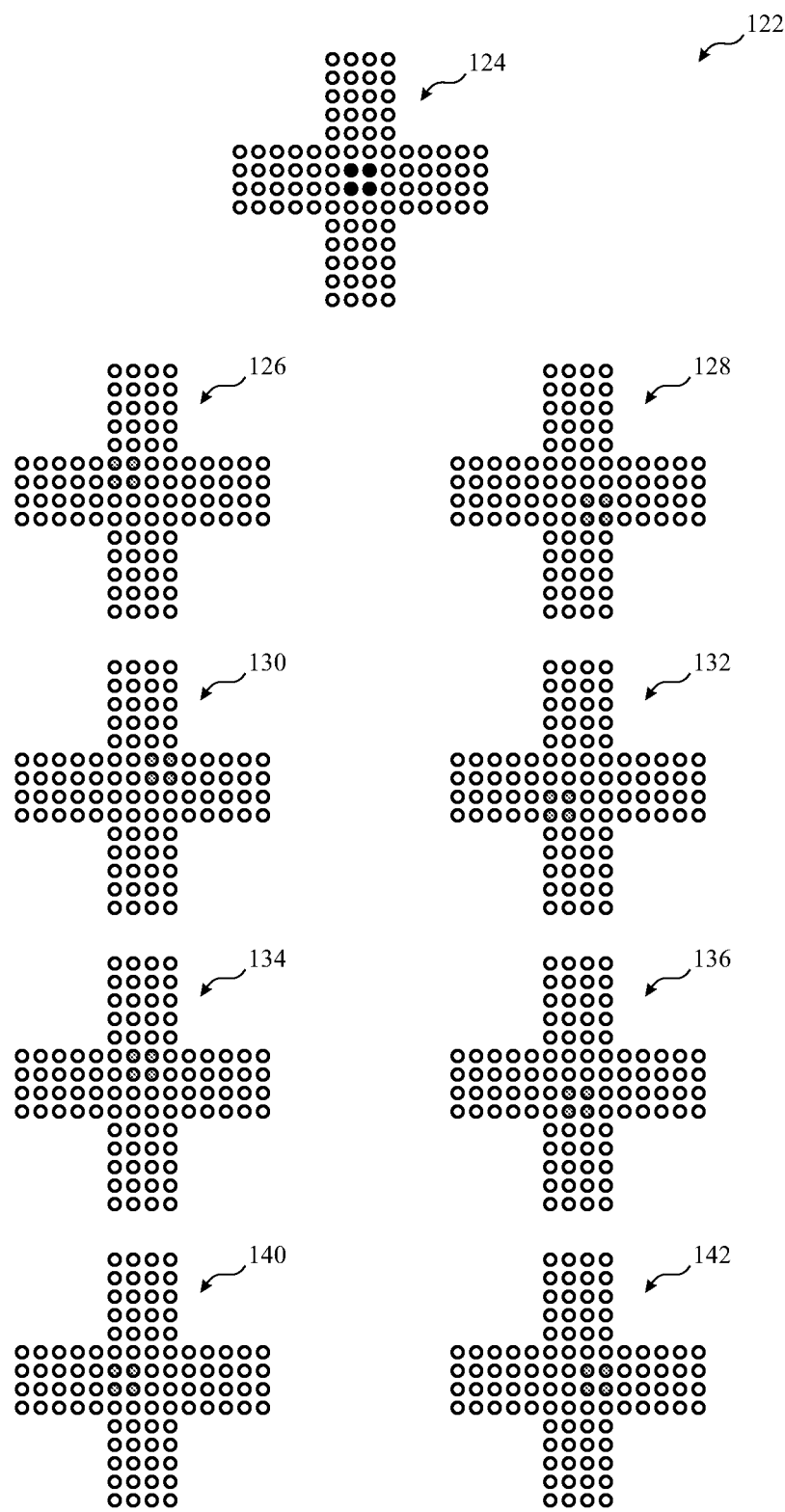
FIG. 12 is a schematic view of pixel locations and example samplings thereof, in accordance with an embodiment.

To generate the SAD and DIFF statistics, the SAD and DIFF statistics collection sub-block 110 may analyze the luma pixel data 84 in multiple directions about each pixel of interest. For example, FIG. 12 illustrates multiple pixel groupings 122 for evaluating luma pixel data 84 at different angles. In some embodiments, a rectangular basis pixel cluster 124 is used as a reference from which to determine the SAD and DIFF statistics for a pixel of interest. In some embodiments, the pixel of interest in the rectangular basis pixel cluster is the top left pixel, however, other pixel locations may also be used as well. When compared to the rectangular basis pixel cluster 124, offset pixel clusters 126, 128, 130, 132, 134, 136, 138, 140, and 142 may yield information about how the luma pixel data 84 changes in the different directions corresponding to the offset pixel clusters 126, 128, 130, 132, 134, 136, 138, 140, and 142. For example, offset pixel clusters 126 and 128 may correspond to a 45 degree offset from the rectangular basis pixel cluster 124. Orthogonal to the 45 degree offset, a 135 degree offset may be represented by offset pixel clusters 130 and 132. Additionally, vertical offset clusters 134 and 136 and horizontal offset clusters 140 and 142 may also be analyzed. In the event a pixel cluster includes a pixel location not within the active region, the pixel value of the closest pixel within the active region may be substituted. In one embodiment, the pixel values of the pixel locations on the edge of the active region may be repeated horizontally and vertically to define values for pixels outside the active region.

Figure 13:
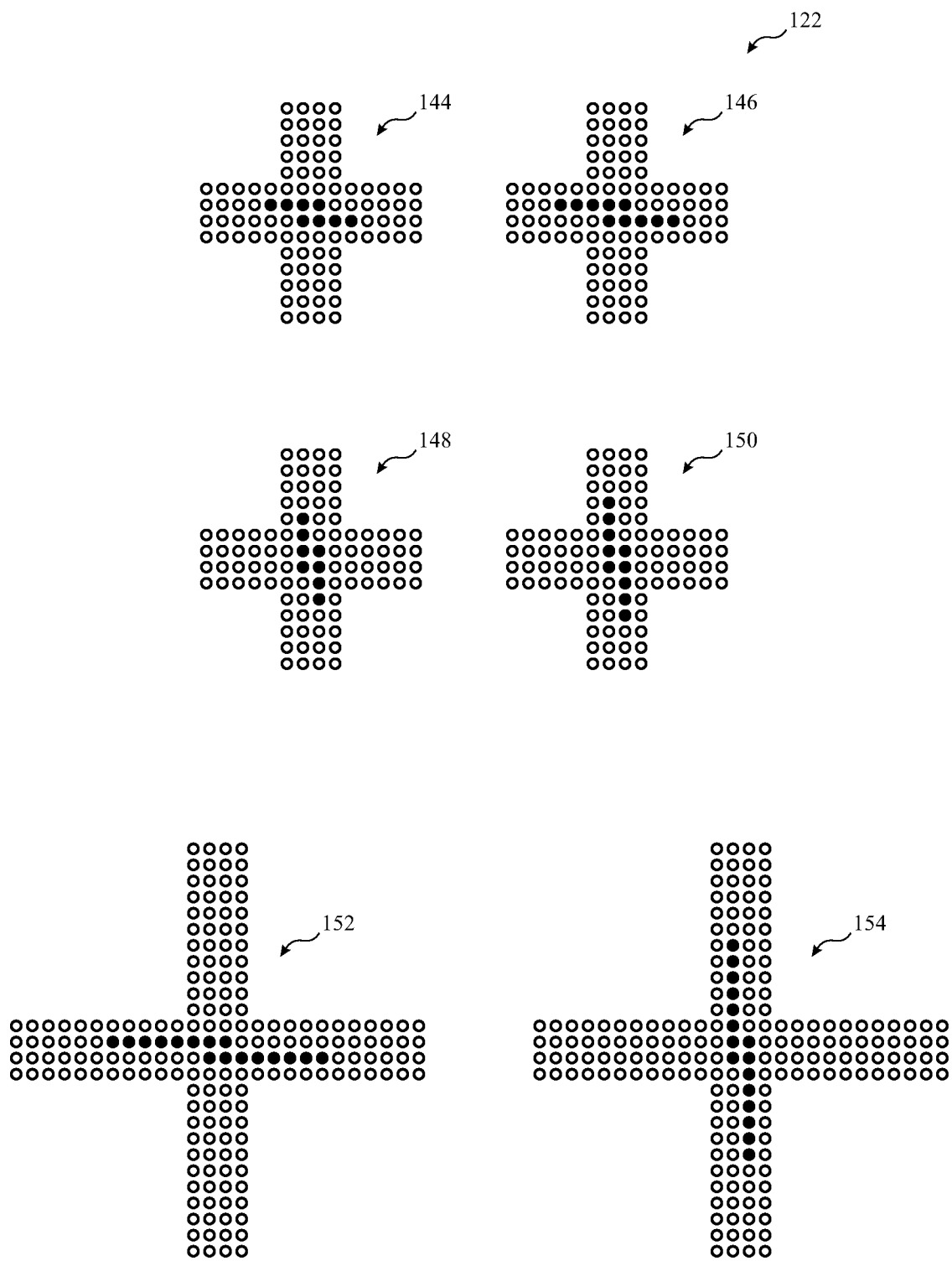
FIG. 13 is a schematic view of pixel locations and example samplings thereof, in accordance with an embodiment.

To represent other angles (e.g., angles with slopes other than 0, −1, 1, or infinity), diagonal basis pixel clusters 144, 146, 148, 150, 152, and 154 may be considered, as shown in FIG. 13. As with the rectangular basis pixel cluster 124, the diagonal basis pixel clusters 144, 146, 148, 150, 152, and 154 may be shifted by an offset and compared to obtain the SAD and DIFF statistics corresponding to the respective angles. In some embodiments, some angles may be better represented by using a greater number of pixels in the pixel cluster. For example, diagonal basis pixel cluster 144 may be used when gathering SAD and DIFF statistics at a slope of ½, and diagonal basis pixel cluster 152 may be used at a slope of ⅙. As such, diagonal basis pixel cluster 144 may utilize more pixels than the rectangular basis pixel cluster 124 and less than diagonal basis pixel cluster 152.

The SAD and DIFF statistics collection sub-block 110 may utilize the sum of absolute differences (SAD) between the basis and offset pixel groupings 122 to calculate metrics for each desired angle. The angles demonstrated by the pixel groupings 122 are shown by example, and, as such, are non-limiting. In some embodiments, evaluation of the content of an image may be accomplished at multiple types of gradients (e.g., slopes, curves, angles, etc.). In addition to using the SAD, differential (DIFF) statistics may also be gathered. DIFF statistics may include metrics such as the difference between successive pixels (e.g., in a line or curve), an edge metric to determine corners and/or edges within the content of the image, and/or other metrics.

In some embodiments, it may be desirable to reduce the bit depth of the input image data 50 or other data (e.g., luma pixel data 84) to a smaller bit depth for ease of manipulation and/or analysis. Such reductions in bit depth may be accomplished by, but not limited to, shift operations, clamping, clipping, and/or truncation. For example, prior to calculating SAD and DIFF statistics, the bit depth of the analyzed data may be reduced by a shift operation followed by a clamp to reduce resource overhead (e.g., time, computational bandwidth, hardware capabilities, etc.). Additionally or alternatively, the bit depth reduction may be scalable based on programmable parameters to set how much bit depth reduction is desired, which may change depending on implementation (e.g., for high definition image processing or low definition image processing). Bit reduction may yield bit depths of any granularity, which may or may not be a multiple of two. Furthermore, bit reduction may also be used in other processing blocks 54 to reduce resource overhead.

The SAD and DIFF statistics collection sub-block 110 may also include a modifier 112 to normalize the angle statistics and account for the different number of pixels used at different angles. In some embodiments, the analyses for each angle and/or metric may be further adjusted by the modifier 112 based on the angle checked. In some scenarios, lower angles (e.g., those with a slope less than ⅓ or ¼ or greater than 2 or 3) may be susceptible to false positives when undergoing SAD and DIFF analysis. As such, confidence in low angle analyses may be less than confidence in a horizontal or vertical direction, and, thus low angle analyses may be adjusted accordingly, for example via the modifier 112. Based on the SAD and DIFF analyses, the sorter 114 may determine one or more best angles. The best angle may correspond to that which best approximates the direction of a uniformity (e.g., a line, an edge, etc.) in the content of the image. In some embodiments, the sorter 114 generates a best angle and a second best angle for further consideration in the angle detection block 60.

In some embodiments, the horizontal and vertical directions may be treated separately from the other angles analyzed by the angle detection block 60. For example, depending on the method of interpolation during scaling, it may be desirable to interpolate diagonally located pixels at angles other than vertical or horizontal. On the other hand, it may also be desirable to use vertical and horizontal interpolation for pixels located directly vertical or horizontal to the original pixels. As such, in some embodiments, the sorter 114 may output a best angle and a second best angle among non-vertical/horizontal angles as well as a best vertical or horizontal angle.

With one or more best angles calculated, the angle detection block 60 may utilize a high frequency and low angle detection sub-block 116 to further evaluate the determined best angle(s). In some scenarios, the content of an image may have high frequency features (e.g., a checkerboard pattern) that may result in indications of angles that do not accurately represent the image (e.g., false angles). The high frequency and low angle detection sub-block 116 may search, for example using the horizontal and vertical DIFF statistics, for such high frequency features. In some embodiments, the best angle(s) may be used to interpolate intermediate pixel values between those of the original pixels, and the high frequency and low angle detection sub-block 116 may check whether the approximated interpolations are consistent with neighboring pixels.

Additionally or alternatively, the high frequency and low angle detection sub-block 116 may utilize one or more conditions and/or parameters to determine the viability of a determined low angle. For example, the difference between consecutive and/or consecutively considered pixel values (e.g., based on luma pixel data 84) may be considered. For a given group of pixels, these differences, (e.g., being positive, negative, or zero) may be considered together in a run (e.g., a string of positive differences, negative differences, or no differences in the pixel values). The length of such runs may be calculated and used as a parameter for one or more low angle conditions to identify one or more low angle dilemmas. For example, if the run length of the pixel value differences is within a configurable range (e.g., less than and/or greater than a threshold set based on implementation) the detected angle may be a false angle (e.g., a false edge detected because of noise), and the confidence in a determined angle may be increased or reduced accordingly.

In some embodiments, recognizing and computing conditions and/or parameters for the high frequency and low angle detection sub-block 116 while maintaining a data throughput of the angle detection block 60 may be expensive to implement in hardware. For example, an 8-bit or 16-bit per pixel value implementation may use eight or sixteen duplicated logical circuits, respectively, to determine a run length within a given time period. However, in some embodiments, a logical circuit design combining forward and backward propagation may provide a single logic circuit scalable to multiple different implementations with minimal cost to data path speed (e.g., less than 5%, 10%, or 20% per doubling of luma pixel data 84 bit-depth) without changing or duplicating the logic circuit. As such, the high frequency and low angle detection sub-block 116 may efficiently check conditions and/or parameters to help identify a confidence in the best angle.

Furthermore, if the best angle and/or second best angle are low angles with reference to the horizontal and vertical (e.g., slopes less than ⅓ and greater than 3) and a high frequency feature or low angle dilemma is detected, the confidence for the low angle(s) may be reduced. In one embodiment, if the best angle is a low angle, the second best angle is not a low angle, and a high frequency feature is detected, the second best angle may be output from the high frequency and low angle detection sub-block 116 as the new best angle, and the old best angle may become the new second best angle.

Additionally, the angle detection block 60 may also include an angle consistency and differential setting sub-block 118. In some embodiments, it may be desirable to use (e.g., for interpolation or comparison) an orthogonal angle with the best angle. The angle consistency and differential setting sub-block 118 may determine an orthogonal angle to the best angle from the previously analyzed angles. As such, each angle analyzed in the SAD and DIFF statistics collection sub-block 110 may have an orthogonal or approximately orthogonal counterpart also analyzed. Additionally, in some embodiments, the best angle and second best angle may be converted to a degree measurement and compared against one another. The best angle and second best angle may be considered consistent if the difference between them is less than a threshold. Angle consistency may boost confidence of the best angle and/or decrease confidence if the angles are not consistent. Additionally, in some embodiments, the confidence metrics of the best angle may also be compared to that of its orthogonal angle to further modify the confidence levels. For example if the confidence that a line or edge in the content of the image exists in the orthogonal direction is nearly as high as that of the best angle, the confidence level for the best angle may be reduced.

The outputs of the SAD and DIFF statistics collection sub-block 110, the sorter 114, the high frequency and low angle detection sub-block 116, and/or the angle consistency and differential setting sub-block 118 may be fed into the mode and weight determination sub-block 120. The mode and weight determination sub-block 120 may determine best mode data 108 corresponding to the best angle, the best horizontal/vertical angle, and/or orthogonal angles for each. Additionally, the best mode data 108 may include weights based at least in part on the confidences of the angles. Furthermore, the weights given to the best angle and best horizontal/vertical angle at a particular pixel position may additionally be based, at least in part, on the best angles of neighboring pixel positions. For example, if the majority of pixels surrounding a pixel of interest have the same best angle as the pixel of interest, the confidence, and therefore weight, of the best angle of the pixel of interest may be increased.

Figure 14:
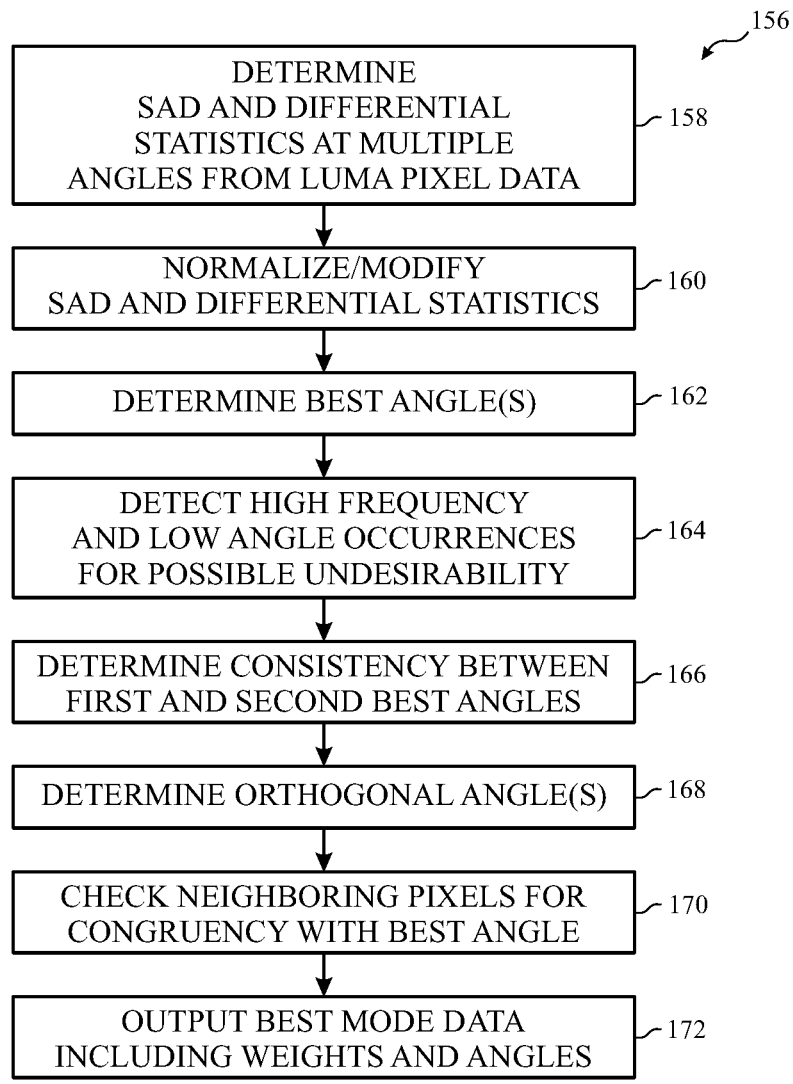
FIG. 14 is a flowchart of a process for operating the angle detection block of FIG. 11, in accordance with an embodiment.

To help illustrate, FIG. 14 is a flowchart 156 depicting the operation of the angle detection block 60 for a single pixel location. The angle detection block 60 may first determine the sum of absolute differences and differential statistics at multiple angles from the luma pixel data 84 (process block 158). The determined SAD and DIFF statistics may be normalized/modified, for example, based on the individual angles (process block 160). Of the angles analyzed, one or more best angles may be determined (process block 162), for example, by the sorter 114. Using the best angle(s), the angle detection block 60 may detect high frequency and low angle occurrences for possible undesirability (process block 164) and adjust a confidence of the angle(s) accordingly. Additionally, the angle detection block may determine the consistency of angles between the first and second best angles (process block 166) as well as determine orthogonal angles to the best angles (process block 168). As stated above, the vertical and horizontal angles may be treated separately from the rest, and, as such, a best horizontal/vertical angle and a corresponding orthogonal angle may also be included. Neighboring pixels may also be checked for congruency with the determined best angle (process block 170), for example, to update the angle confidence. The angle detection block 60 may then output the best mode data 108 including the best angle(s) and corresponding weights (process block 172), for example, for use in the directional scaling block 62.

Figure 15:
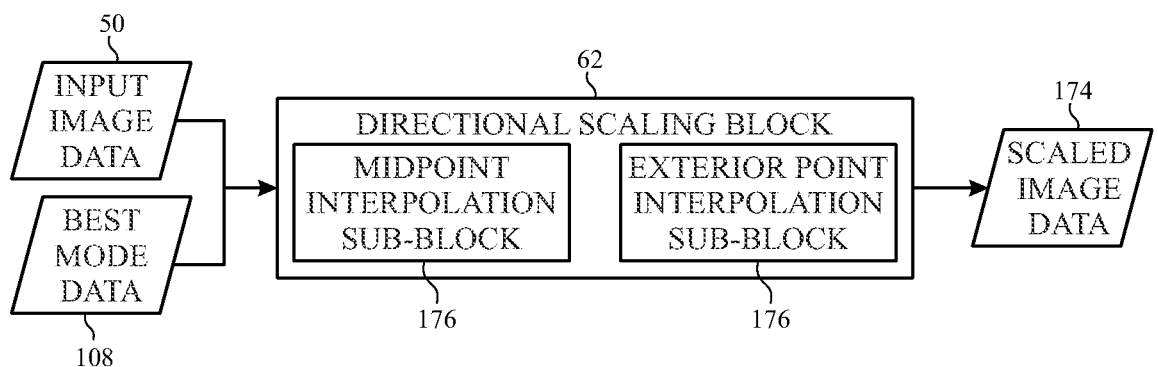
FIG. 15 is a block diagram of a directional scaler block implemented in the scaler block of FIG. 7, in accordance with an embodiment.

When received by the directional scaling block 62, the best mode data 108 and the input image data 50 may be combined to generate scaled image data 174, as depicted in FIG. 15. In one embodiment, the directional scaling block 62 may include a midpoint interpolation sub-block 176 and an exterior point interpolation sub-block 178. Although stated above as using the luma pixel data 84 for angle analysis, other color channels may also be used to gather statistics for angle detection and directional scaling. Furthermore, the best mode data 108 gathered from a single channel may be used to scale multiple color channels. As such, the same weights, or a derivative thereof, and angles for interpolation may be used in the midpoint interpolation sub-block 176 and exterior point interpolation sub-block 178 for each color channel.

Figure 16:
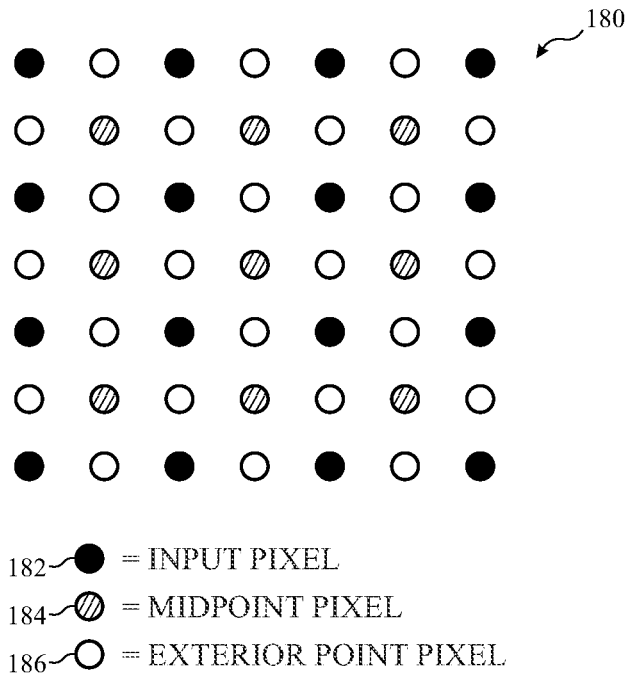
FIG. 16 is a schematic view of example pixel interpolation points, in accordance with an embodiment.

In some embodiments, a pixel grid 180 may schematically represent the locations and relative positions of pixels, as shown in FIG. 16. The directional scaling block 62 may use input pixels 182 to interpolate midpoint pixels 184 and exterior point pixels 186. Additionally, in some embodiments, the midpoint pixels 184 are interpolated prior to the exterior point pixels 186. Due to the lack of pixel data in the vertical or horizontal directions around the midpoint pixels 184, the midpoint pixels 184 may be interpolated in a diagonal fashion using the best angle, orthogonal angle, and/or the weights from the best mode data 108. Using the neighboring input pixels 182, the midpoint interpolation sub-block 176 may determine a value for each color channel of each midpoint pixel 184. The weighting of the interpolation of each surrounding input pixel 182 is based, at least in part, on the weights of best mode data 108. As such, weights of the best mode data may correspond to weights in a weighted average of neighboring pixel values. In some embodiments, temporary pixel values may be established by interpolating two or more input pixels 182. The temporary pixel values may then be used to interpolate the midpoint pixels 184. Such temporary pixel values may be used to better interpolate a value of a midpoint pixel 184 at a particular angle. Additionally, in some embodiments, a horizontal/vertical interpolation of the midpoint pixels 184 may be generated based at least in part on the best vertical/horizontal angle and blended with the diagonal interpolation to generate values for the midpoint pixels 184.

Once the midpoint pixels 184 have been determined, the exterior point pixels 186 may be determined. Unlike the midpoint pixels 184, each exterior point pixel 186 has input or determined pixel data both vertically and horizontally surrounding it. As such, the best vertical/horizontal angle and weight may be used to interpolate the exterior point pixels 186. For example, an exterior point pixel 186 may be interpolated with a higher weight given to pixels above and below the exterior point pixel 186 if the determined best vertical/horizontal angle is in the vertical direction. As will be appreciated, a combination of vertical/horizontal and diagonal best angles may also be used for either the midpoint pixel interpolation or the exterior point interpolation. Additionally, in some embodiments, the exterior point pixels 186 may be determined before the midpoint pixels 184.

In some embodiments, the directional scaling block 62 may scale at a fixed rate, for example multiplying the dimensions by 2, 4, etc. To achieve higher or lower levels of resolution scaling, the directional scaling block 62 may be implemented multiple times (e.g., cascaded), and/or the vertical/horizontal scaling block 66 may be employed to achieve off-multiple resolutions (e.g., resolutions of 1.2, 2.5, 3.75, or other multiples of the input resolution). The vertical/horizontal scaling block 66 may include linear scalers, polyphase scalers, and/or any suitable scaler to achieve the desired resolution. Furthermore, scaling may be accomplished such that each dimension has a different scaled multiple. Additionally or alternatively, the vertical/horizontal scaling block 66 may scale the input image data 50 in parallel with the directional scaling block 62. In such a case, the output of the vertical/horizontal scaling block 66 and the output of the directional scaling block 62 may be blended to generate the scaled image data 174.

Figure 17:
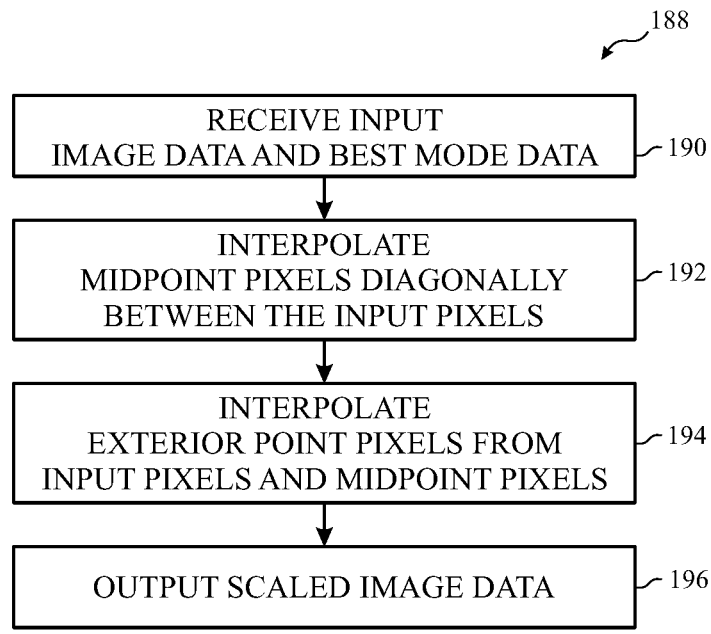
FIG. 17 is a flowchart of a process for operating the directional scaling block of FIG. 15, in accordance with an embodiment.

In further illustration, FIG. 17 is a flowchart 188 depicting the simplified operation of the directional scaling block 62. The directional scaling block 62 may first receive the input image data 50 and the best mode data 108 (process block 190). The directional scaling block may also interpolate the midpoint pixels 184 diagonally between the input pixels 182 (process block 192) and interpolate the exterior point pixels 186 from the input pixels 182 and the midpoint pixels 184 (process block 194). Scaled image data 174 is then output (process block 196).

Figure 18:
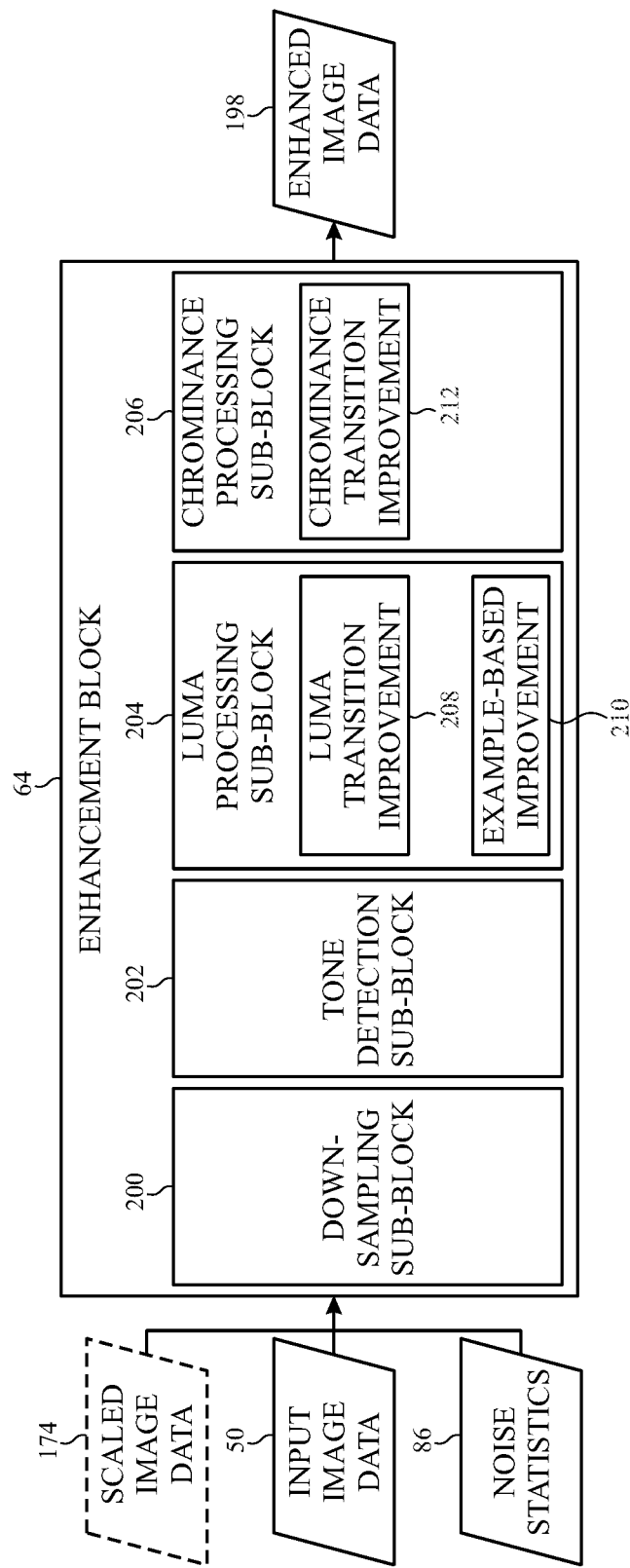
FIG. 18 is a block diagram of an image enhancement block implemented in the scaler block of FIG. 7.

In some embodiments, the scaled image data 174 may be sent to an image enhancement block 64. The image enhancement block 64 may additionally be used outside of the scaler block 46. In fact, in some embodiments, the image enhancement block 64 may enhance the input image data 50 without upscaling to a higher resolution. As depicted in FIG. 18, the image enhancement block 64 may take either scaled image data 174, input image data 50, or both as well as the noise statistics as input, and output enhanced image data 198. If the scaled image data 174 is not available, the image enhancement block 64 may utilize a down-sampling sub-block 200 to take a sample (e.g., 1 out of 4 pixels) of the input image data 50. This may also correspond to the sampling of the noise statistics block 58, where, if the directional scaling block 62 is disabled, a sub-sample of the input image data 50 may be used. The down-sampled image data may be used as a low resolution input of an example-based improvement. If the scaled image data 174 is available, the input image data 50 may be used as the low resolution input.

The image enhancement block 64 may also include a tone detection sub-block 202, a luma processing sub-block 204 and a chrominance processing sub-block 206. The tone detection sub-block 202 may search the image content for recognizable color tones matching possible image representations (e.g., the sky, grass, skin, etc.). In some embodiments, the tone detection sub-block 202 may combine multiple color channels to determine if a recognizable color tone is present. Furthermore, in some embodiments, the tone detection sub-block 202 may convert one or more color channels into a hue, saturation, value (HSV) format for analysis. Each searched color tone may also be given a confidence level based at least in part on the likelihood that the detected color tone is characteristic of the image representation. The recognition of color tones within the image may lead to improved enhancement of the image by including an improved evaluation of the image content. For example, the luma processing sub-block 204 and chrominance processing sub-block 206 may use the color tone data to adjust (e.g., with increased or reduced enhancement) the luma and chrominance values of the input image data 50 or scaled image data 174 in the areas where the color tones were detected. In one embodiment, the effects on areas of the various color tones may be software programmable.

In one embodiment, the luma processing sub-block 204 enhances (e.g., sharpens) a luma channel of the input image data 50 or scaled image data 174, and includes luma transition improvement 208 and example-based improvement 210. The luma transition improvement 208 may include one or more horizontal or vertical filters (e.g., high-pass and/or low-pass) arranged with adaptive or programmable gain logic as a peaking filter. The peaking filter may boost programmable ranges of frequencies corresponding to content features of the image (e.g., cross hatching, other high frequency components). The boosted frequency ranges may provide better frequency and/or spatial resolution to the luma channel. Additionally, the luma transition improvement 208 may include coring circuitry to minimize the amount of luma enhancement in noisy areas of the input image data 50, for example, as determined by the noise statistics block 58. Furthermore, the luma transition improvement 208 may use an edge metric, for example the edge metric determined from the SAD and DIFF statistics collection sub-block 110, within the coring circuitry to reduce overshoot and/or undershoots that may occur near edge transitions, for example due to the boosted frequency ranges.

Figure 19:
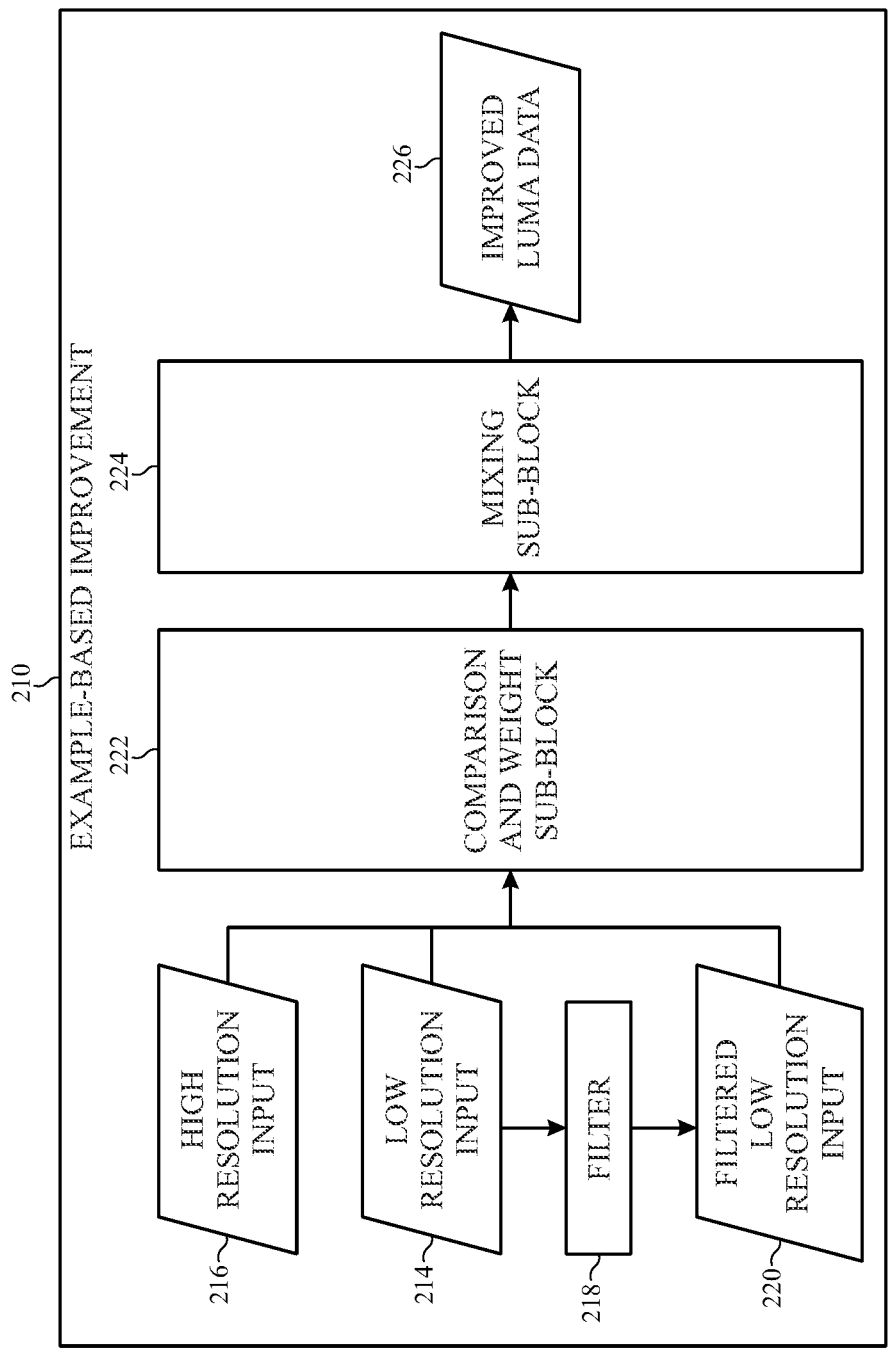
FIG. 19 is a block diagram of an example-based improvement implemented in the image enhancement block of FIG. 18.

Additionally, an example-based improvement 210 may run in parallel or series with the luminance transition improvement 208 as part of the luma processing sub-block 204. The example-based improvement 210 may take a low resolution input 214 and compare sections (e.g., 5×5 pixel sections) thereof against sections of the high resolution input 216 (e.g., input image data 50 or scaled image data 174), as shown in FIG. 19. In some embodiments, the example-based improvement 210 may gather multiple (e.g., 25) sections (e.g., 5×5 pixel sections) of the low resolution input 214 to and compare each to a single section of the high resolution input 216. Additionally, the low resolution input 214 may pass through a filter 218 (e.g., a low pass filter) to generate filtered low resolution input 220. The high resolution input 216, low resolution input 214, and/or the filtered low resolution input 220 may be assessed in the comparison and weight sub-block 222. For example, the comparison and weight sub-block 222 may utilize the sum of square differences or a squared difference approximation of the luma channel values. In some embodiments, employing the sum of square differences may be a resource (e.g., time, computational bandwidth) intensive process, and, therefore, it may be desirable to utilize the squared difference approximation instead.

A squared difference approximation may be accomplished between each value of a section of the low resolution input 214 and a section of the high resolution input 216. In one embodiment, a single squared difference may be approximated using a function for returning the number of leading zeros of a bitwise value, where the bitwise value corresponds to the difference between a value of the section of the high resolution input 216 and the corresponding value of the section of the low resolution input 214. A summation of the squared difference approximations may then represent, at least partially, an approximation of the sum of squared differences between the section of the high resolution input 216 and the section of the low resolution input 214. The sum of squared differences approximation may be accomplished between each of the multiple (e.g., 25) sections (e.g., 5×5 pixel sections) of the low resolution input 214 and a single section of the high resolution input 216 for use in the comparison and weight sub-block 222. Other operations may also be included in the calculation of a squared difference approximation or a sum of squared differences approximation such as clipping, multiplication by a programmable parameter, bit shifts, etc.

Depending on the similarities and differences of the high resolution input 216, the low resolution input 214, and/or the filtered low resolution input 220, the comparison and weight sub-block 222 may determine weights from which to generate a weighted average of the inputs. For example, the comparison and weight sub-block 222 may apply a look-up table to the similarities and/or differences to generate the weights for the weighted average. Based at least in part on the weights generated, the mixing sub-block 224 may combine the inputs to generate the improved luma data 226. Furthermore, the luma processing sub-block 204 may combine the improved luma data 226 from the example-based improvement 210 with the peaking and coring improvements of the luma transition improvement 208 based, for example, on gradient statistics.

Gradient statistics may be indicative of a linear change in pixel values in a particular direction (e.g., in an x-direction and/or y-direction relative to the pixel grid 180). For example, a weighted average of changes in pixel values in the x-direction may be combined with a weighted average of changes in pixel values in the y-direction to determine how to blend the improved luma data 226 from the example-based improvement 210 with the peaking and coring improvements of the luma transition improvement 208. The example-based improvement 210 may yield improved identification and display of the dominant gradients within the image, and the luma transition improvement 208 may improve perceived texture in the image, the combination of which, may allow for enhanced (e.g., sharpened) luma channel output.

Similar to the luma transition improvement 208, the chrominance processing sub-block 206 may include a chrominance transition improvement 212 including peaking filters and coring circuitry. In some embodiments, the chrominance transition improvement 212 may be further enhanced based at least in part on the luma transition improvement 208. In some scenarios, if the luma channel is enhanced without compensating the chrominance channel (s), the image may appear over or under saturated. As such, the chrominance transition improvement 212 may employ the change in the luma channel due to the luma processing sub-block 204 in determining the change from the chrominance transition improvement 212. Additionally or alternatively, the chrominance transition improvement 212 may be disabled if, for example, there is little or no luma channel enhancement. As output from the image enhancement block 64, the enhanced image data 198 (e.g., the enhanced luma and chrominance channels) may represent a sharpened and vibrant image.

Figure 20:
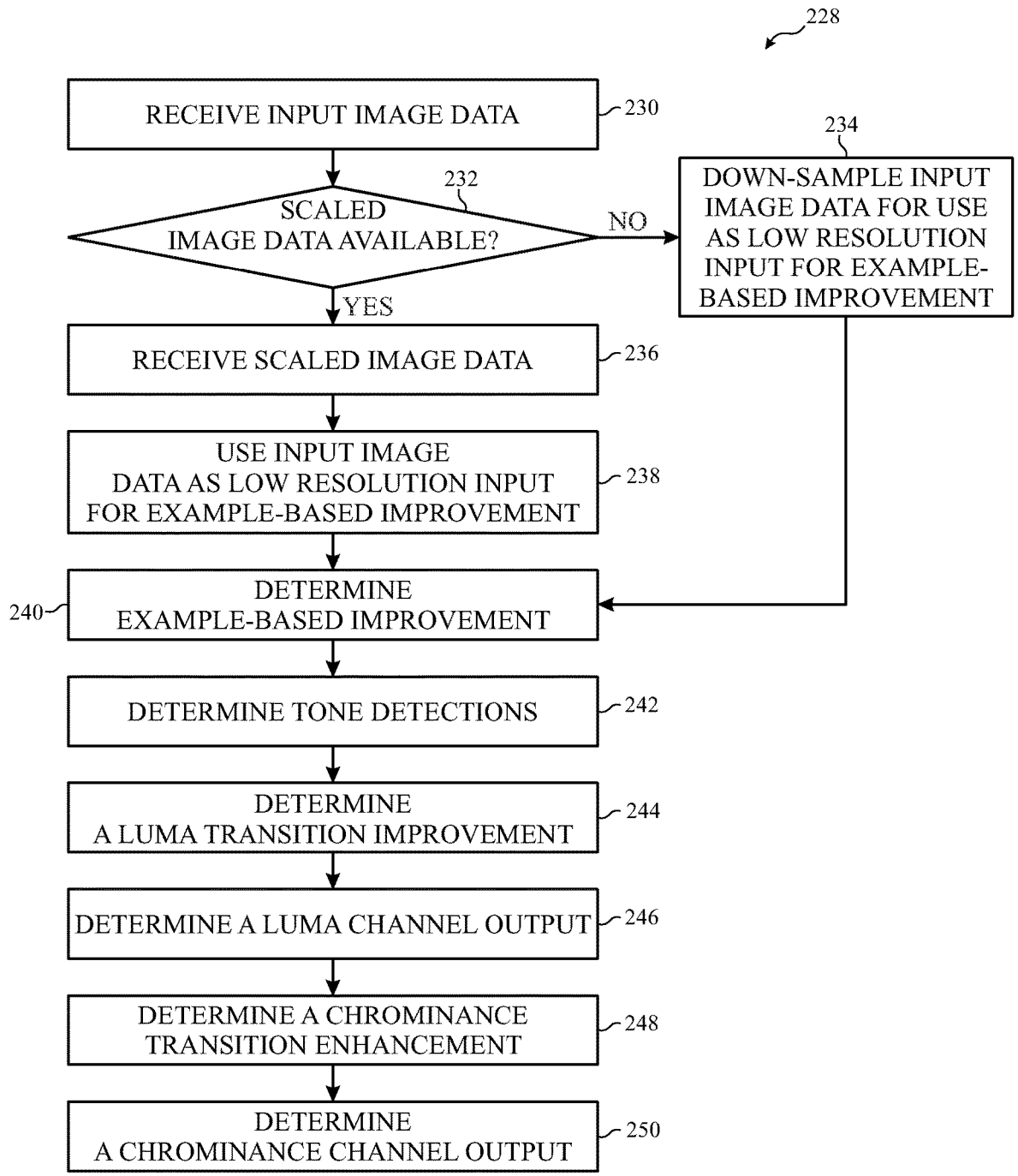
FIG. 20 is a flowchart of a process for operating the enhancement block of FIG. 18, in accordance with an embodiment.

To help further illustrate, FIG. 20 is a flowchart 228 representing an example process of the image enhancement block 64. The image enhancement block 64 may receive the input image data 50 (process block 230) and determine if scaled image data 174 is available (decision block 232). If the scaled image data 174 is not available, the input image data 50 may be down-sampled for use as the low resolution input 214 for the example-based improvement 210 (process block 234). However, if the scaled image data 174 is available, the scaled image data 174 may be received (process block 236), and the input image data 50 may be used as the low resolution input 214 for the example-based improvement 210 (process block 238). As such, the example-based improvement 210 may be determined (process block 240). Additionally, the image enhancement block 64 may determine tone detections (process block 242), for example, via the tone detection sub-block 202. The image enhancement block 64 may also determine a luma transition improvement 208 (process block 244) and a luma channel output (process block 246). A chrominance transition improvement 212 may also be determined (process block 248), for example, using the luma channel output, and the chrominance channel output(s) may be determined (process block 250). Together, the luma channel output and the chrominance channel output(s) form the enhanced image data 198.

In some embodiments, the enhanced image data 198 may be scaled after enhancement. For example, the enhanced image data 198 may pass through the vertical/horizontal scaling block 66 after enhancement. Additionally or alternatively, the enhanced image data 198 may be scaled in the directional scaling block 62 before and/or after enhancement. Scaling and/or enhancement may be cascaded multiple times until a desired resolution is achieved.

As will be appreciated, the multiple components of the scaler block 46 (e.g., transform block 56, noise statistics block 58, angle detection block 60, directional scaling block 62, image enhancement block 64, vertical/horizontal scaling block 66) may be enabled, disabled, or employed together or separately depending on implementation. Furthermore, the order of use within scaler block 46 may also be altered (e.g., switched, repeated, run in parallel or series, etc.) depending on implementation. As such, although the above referenced flowcharts are shown in a given order, in certain embodiments, process/decision blocks may be reordered, altered, deleted, and/or occur simultaneously. Additionally, the referenced flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:
1. An electronic device comprising:
an electronic display configured to display an output image based at least in part on scaled pixel data; and
image processing circuitry configured to generate the scaled pixel data, wherein the image processing circuitry comprises:
angle detection circuitry configured to:
receive input pixel data corresponding to an input image;
analyze the input pixel data relative to a plurality of angles;

determine mode data corresponding to one or more angles of the plurality of angles identified as associated with the input image based at least in part on analysis of the input pixel data;

verify the one or more angles of the mode data as indicative of the input image;

adjust one or more respective confidence levels associated with the one or more angles based at least in part on the verifying; and determine best mode data based at least in part on the mode data and the adjusted one or more respective confidence levels, wherein the best mode data comprises:
 a first angle having a highest confidence level among a first set of confidence levels, of the adjusted one or more respective confidence levels, associated with horizontal and vertical angles; or
 a second angle having another highest confidence level among a second set of confidence levels, of the adjusted one or more respective confidence levels, associated with non-horizontal and non-vertical angles; or
 both; and scaling circuitry configured to scale the input pixel data to generate the scaled pixel data based at least in part on the best mode data.

2. The electronic device of claim 1, wherein scaling the input pixel data comprises:
 interpolating a first new pixel value, having a first pixel position diagonal to pixel positions of the input pixel data, based at least in part on the second angle; and
 interpolating a second new pixel value, having a second pixel position horizontal or vertical to the pixel positions of the input pixel data, based at least in part on the first angle.

3. The electronic device of claim 1, wherein scaling the input pixel data comprises interpolating between respective pixel values of the input pixel data to determine intermediate pixel values based at least in part on respective weights, wherein the respective weights are based at least in part on the best mode data.

4. The electronic device of claim 3, wherein the respective weights are based at least in part on a confidence level of an angle of the best mode data.

5. The electronic device of claim 1, wherein verifying the one or more angles of the mode data as indicative of the input image comprises comparing a first angle of the one or more angles, having a highest confidence level of the one or more respective confidence levels, to a second angle of the one or more angles, having a second highest confidence level of the one or more respective confidence levels.

6. The electronic device of claim 5, wherein adjusting the one or more respective confidence levels comprises:
 in response to a difference between the first angle and the second angle being less than a first threshold, increasing the highest confidence level, the second highest confidence level, or both; or
 in response to the difference between the first angle and the second angle being greater than a second threshold, decreasing the highest confidence level, the second highest confidence level, or both; or
 both.

7. The electronic device of claim 1, wherein verifying the one or more angles of the mode data as indicative of the input image comprises searching for one or more frequency features of the input image.

8. The electronic device of claim 7, wherein, in response to finding the one or more frequency features in the input image, reducing a confidence level associated with the one or more angles.

9. The electronic device of claim 1, wherein verifying the one or more angles of the mode data as indicative of the input image comprises comparing a first confidence level associated with a first angle of the one or more angles to a second confidence level associated with a second angle orthogonal to the first angle.

10. A tangible, non-transitory, machine-readable medium comprising instructions that, when executed by one or more processors, cause the one or more processors to perform operations comprising:
 receiving input pixel data corresponding to an input image;
 analyzing the input pixel data relative to a plurality of angles;
 determining mode data corresponding to one or more angles of the plurality of angles identified as associated with the input image based at least in part on analysis of the input pixel data;
 verifying the one or more angles of the mode data as indicative of the input image;
 adjusting one or more respective confidence levels associated with the one or more angles based at least in part on the verifying;
 determining best mode data based at least in part on the mode data and the adjusted one or more respective confidence levels, wherein the best mode data comprises:
  a first angle having a highest confidence level among a first set of confidence levels, of the adjusted one or more respective confidence levels, associated with horizontal and vertical angles; or
  a second angle having another highest confidence level among a second set of confidence levels, of the adjusted one or more respective confidence levels, associated with non-horizontal and non-vertical angles; or
  both; and
 scaling the input pixel data to generate scaled pixel data based at least in part on the best mode data.

11. The tangible, non-transitory, machine-readable medium of claim 10, wherein scaling the input pixel data comprises interpolating between respective pixel values of the input pixel data to determine intermediate pixel values based at least in part on respective weights, wherein the respective weights are based at least in part on an angle of the best mode data.

12. The tangible, non-transitory, machine-readable medium of claim 11, wherein the respective weights are based at least in part on a confidence level of the angle.

13. The tangible, non-transitory, machine-readable medium of claim 10, wherein verifying the one or more angles of the mode data as indicative of the input image comprises determining differences between consecutive pixel values of the input pixel data to determine a run of same differences, wherein the run of same differences comprises:
 a string of consecutive positive differences;
 a string of consecutive negative differences; or
 a string of consecutive zero differences.

14. The tangible, non-transitory, machine-readable medium of claim 13, wherein verifying the one or more angles of the mode data as indicative of the input image comprises comparing a run length of the run of same differences to a threshold run length and adjusting the one or more respective confidence levels based at least in part on the comparing.

15. The tangible, non-transitory, machine-readable medium of claim 10, wherein verifying the one or more angles of the mode data as indicative of the input image comprises searching for one or more frequency features of the input image.

16. The tangible, non-transitory, machine-readable medium of claim 10, wherein the operations comprise comparing the best mode data at a first pixel location to the best mode data at a second pixel location surrounding the first pixel location, wherein adjusting the one or more respective confidence levels comprises, in response to determining that the best mode data at the first pixel location is the same as the best mode data at the second pixel location, increasing a confidence level associated with the first pixel location.

17. Image processing circuitry configured to: receive input pixel data corresponding to an input image; analyze the input pixel data relative to a plurality of angles; determine respective confidence levels for the plurality of angles based at least in part on the analyzing of the input pixel data, wherein the respective confidence levels correspond to respective likelihoods that each of the plurality of angles are indicative of the input image; select an angle of the plurality of angles based on a respective confidence level, of the respective confidence levels, for the angle, wherein the angle is determined from best mode data comprising: a first angle having a highest confidence level among a first set of confidence levels, of the respective confidence levels, associated with horizontal and vertical angles; or a second angle having another highest confidence level among a second set of confidence levels, of the respective confidence levels, associated with non-horizontal and non-vertical angles; or both; and interpolate a new pixel value of scaled pixel data based at least in part on a weighted combination of pixel values of the input pixel data, wherein weights of the weighted combination are based at least in part on the respective confidence level of the angle and are different for different respective confidence levels for the angle.

18. The image processing circuitry of claim 17, wherein the image processing circuitry is configured to: verify one or more angles of the plurality of angles as indicative of the input image; and adjust one or more respective confidence levels, of the respective confidence levels, associated with the one or more angles based at least in part on the verifying.

19. The image processing circuitry of claim 18, wherein verifying the one or more angles as indicative of the input image comprises comparing a first angle of the one or more angles, having a highest confidence level of the one or more respective confidence levels, to a second angle of the one or more angles, having a second highest confidence level of the one or more respective confidence levels.

* * * * *